(12) United States Patent
Hair et al.

(10) Patent No.: US 8,769,273 B2
(45) Date of Patent: *Jul. 1, 2014

(54) METHOD AND SYSTEM FOR ESTABLISHING A TRUSTED AND DECENTRALIZED PEER-TO-PEER NETWORK

(75) Inventors: Arthur R. Hair, Upper St. Clair, PA (US); Christopher Gorski, Pittsburgh, PA (US); Charles A. Greiner, Irwin, PA (US)

(73) Assignee: DMT Licensing, LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,714

(22) Filed: Jul. 12, 2012

(65) Prior Publication Data

US 2012/0278617 A1    Nov. 1, 2012

Related U.S. Application Data

(62) Division of application No. 12/806,165, filed on Aug. 6, 2010, now Pat. No. 8,245,036, which is a division of application No. 09/710,380, filed on Nov. 10, 2000, now Pat. No. 7,903,822.

(51) Int. Cl.
*H04L 9/00* (2006.01)

(52) U.S. Cl.
USPC .......................................................... 713/165

(58) Field of Classification Search
USPC .......... 713/161, 165, 168, 171, 176; 709/225, 709/227; 380/282–285
See application file for complete search history.

(56) References Cited

U.S. PATENT DOCUMENTS

| | | | | |
|---|---|---|---|---|
| 6,167,432 A * | 12/2000 | Jiang | ............................. | 709/204 |
| 6,311,209 B1 * | 10/2001 | Olson et al. | ................... | 709/204 |
| 6,363,154 B1 * | 3/2002 | Peyravian et al. | ............ | 380/283 |
| 6,587,870 B2 * | 7/2003 | Takagi et al. | ................. | 709/204 |
| 6,701,344 B1 * | 3/2004 | Holt et al. | ..................... | 709/204 |
| 6,834,346 B1 * | 12/2004 | Ishibashi et al. | ............. | 713/179 |
| 6,980,660 B1 * | 12/2005 | Hind et al. | .................... | 380/282 |
| 2001/0044879 A1 * | 11/2001 | Moulton et al. | .............. | 711/114 |

OTHER PUBLICATIONS

Dingledine, Roger "The Free Haven Project: Design and Deployment of an Anonymous Secure Data Haven" May 2000, pp. 1-95.*

* cited by examiner

*Primary Examiner* — Beemnet Dada
(74) *Attorney, Agent, or Firm* — Ansel M. Schwartz

(57) ABSTRACT

The present invention offers a new and improved method and system to establish a trusted and decentralized peer-to-peer network for: the sharing of computer files between and among computing devices; trusted chat sessions; and for other applications of trusted peer-to-peer networks.

20 Claims, 17 Drawing Sheets

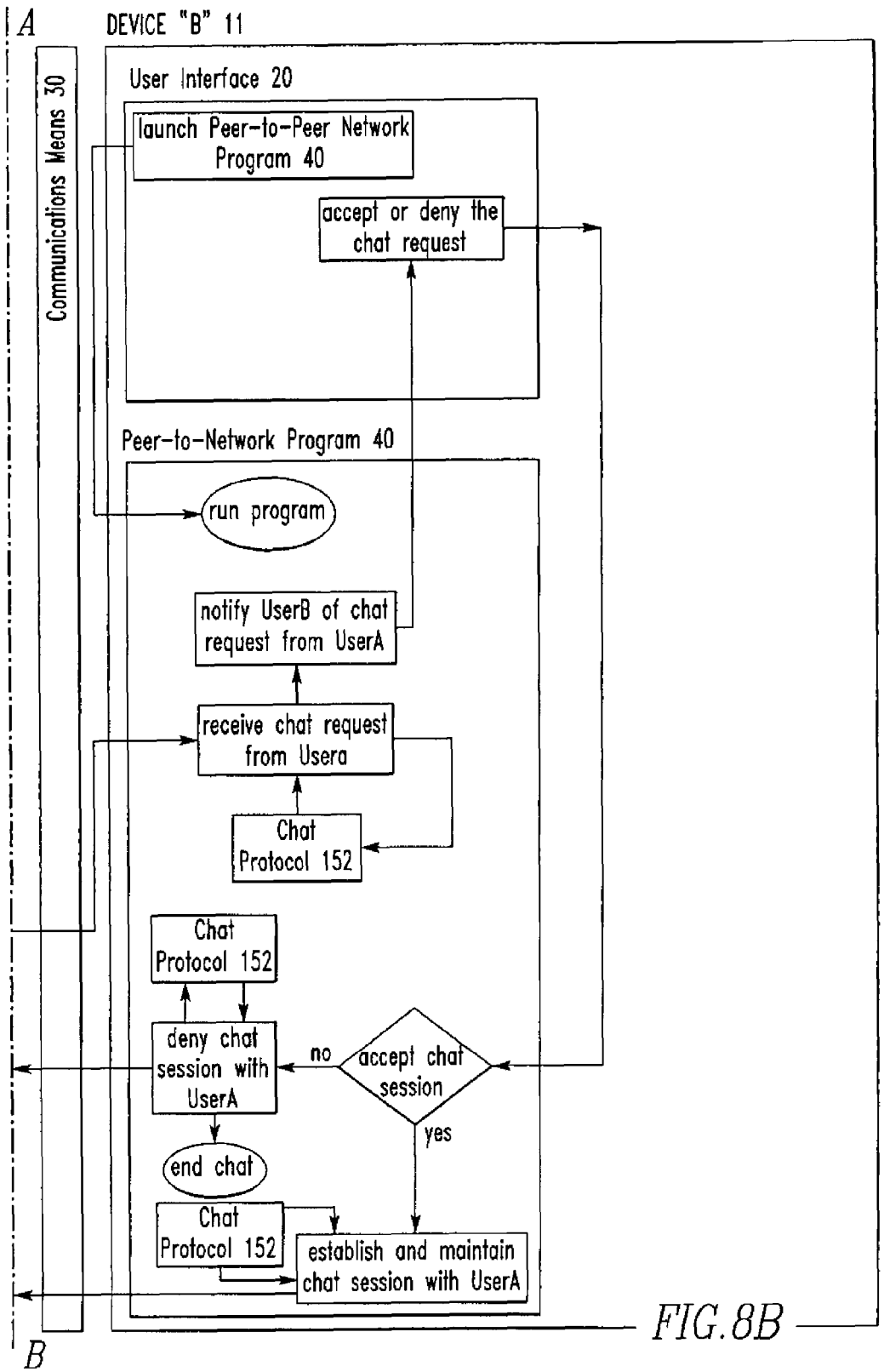

METHOD AND SYSTEM FOR ESTABLISHING A TRUSTED AND DECENTRALIZED PEER-TO-PEER NETWORK

CROSS-REFERENCE TO RELATED APPLICATIONS

This is a divisional of U.S. patent application Ser. No. 12/806,165 filed Aug. 6, 2010 now U.S. Pat. No. 8,245,036, which is a divisional of U.S. patent application Ser. No. 09/710,380 filed Nov. 10, 2000 now U.S. Pat. No. 7,903,822, both of which are incorporated by reference herein.

FIELD OF THE INVENTION

The present invention is related to a trusted and decentralized peer-to-peer network method and system.

BACKGROUND OF THE INVENTION

Important to the business of selling movies electronically via the Internet includes efficient electronic distribution and/or file sharing. The process of sharing computer files (including digitized movies) via communications means has increased in importance with the proliferation of the Internet for electronic distribution and file transfer. The creation of file sharing and/or peer-to-peer networks (e.g. Gnutella) has enabled users of computer workstations, which lack traditional serving software to distribute computer files. Traditionally, serving computers (e.g. computers running Microsoft Windows 2000 Server) performed the task of distributing computer files to client work stations using a centralized network architecture. The advent of file sharing and/or peer-to-peer networks gave way to a decentralized network architecture comprised of multiple computer workstations (e.g. host nodes) acting as redundant repositories, each capable of transferring the same computer files. Some of the current file sharing and/or peer-to-peer networks communicate in an open and un-trusted manner. Additionally, trusted peer-to-peer networks have relied on a centralized process of identifying members and their related IP address to establish the trusted peer-to-peer network.

SUMMARY OF THE INVENTION

The present invention offers a new and improved method and system to establish a trusted and decentralized peer-to-peer network for: the sharing of computer files between and among computing devices; trusted chat sessions; and for other applications of trusted peer-to-peer networks. Additionally, the present invention also offers a new and improved method and system to provide file identification properties or attributes prior to the actual download of the file through file sharing utilizing a trusted and decentralized peer-to-peer network. The present invention can be a software program residing computing devices permitting users to automatically interact in a trusted peer-to-peer manner during the file sharing process.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
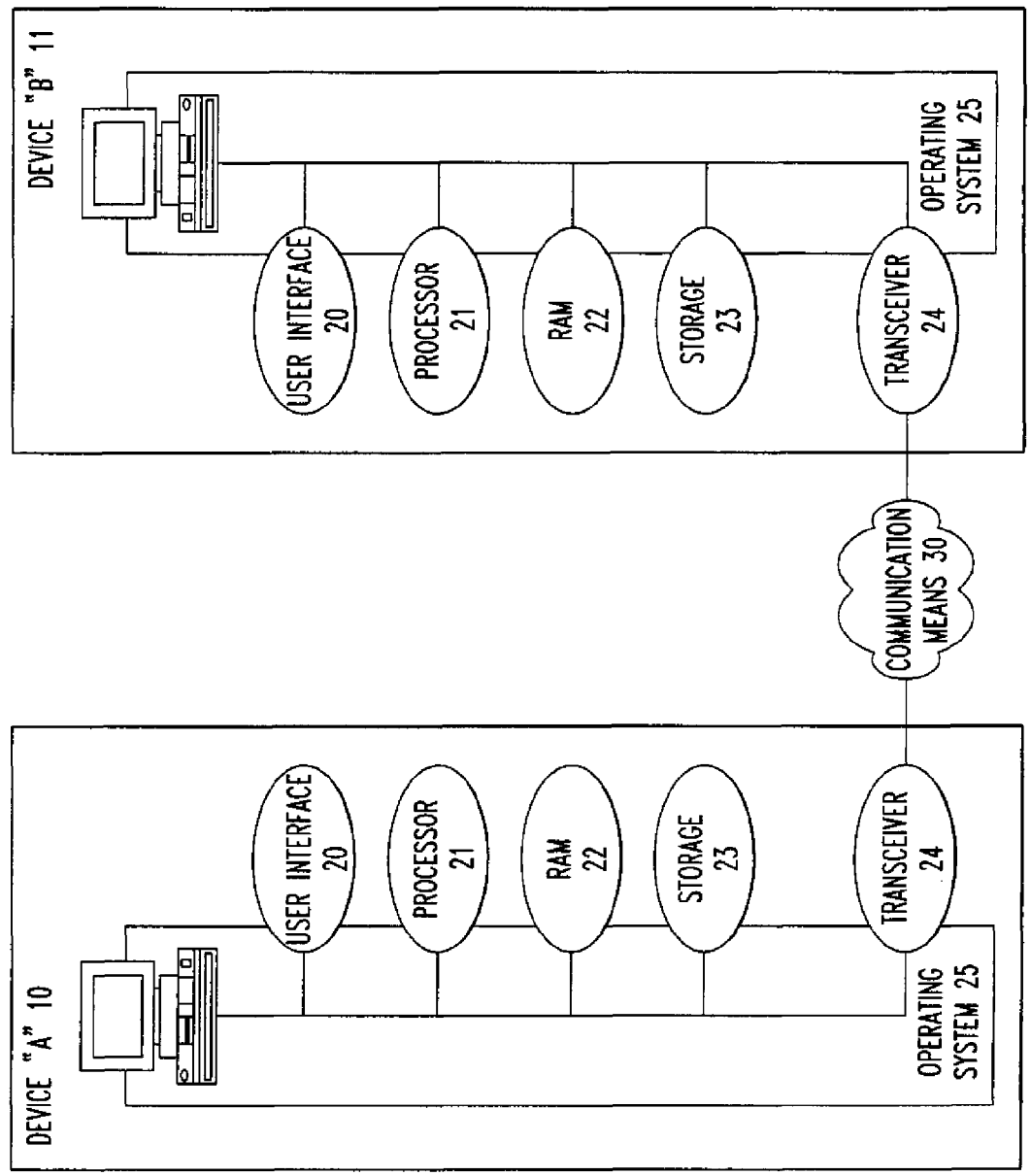
FIG. 1 is a schematic diagram which may be used in carrying out the teachings of this invention for the purpose of establishing a trusted and decentralized peer-to-peer network to depict a configuration in which computing devices can be connected to in conjunction with the establishment of a trusted and decentralized peer-to-peer network.

Referring now to the drawings wherein like reference numerals refer to similar or identical parts throughout the several views, and more specifically to FIG. 1 thereof, there is shown a system for establishing a trusted and decentralized peer-to-peer network. The system comprises multiple computing devices (e.g. Device "A" 10, Device "B" 11) each having a connection to a Communications Means 20 and each possessing the means to: utilize communication protocols (e.g. FTP Protocol 150, HTTP Protocol 151, Chat Protocol 152, File Sharing Protocols 153); utilize a communications program (e.g. the E-mail Program 130); transfer or download the computer files. The system comprises multiple computing devices (e.g. Device "A" 10, Device "B" 11) each having a User Interface 20 through which the user of the respective computing devices interfaces. The system comprises multiple computing devices (e.g. Device "A" 10, Device "B" 11) each having a Processor 21 that processes computation instructions. The system comprises multiple computing devices (e.g. Device "A" 10, Device "B" 11) each having a RAM 22 that provides memory for the respective computing devices. The system comprises multiple computing devices (e.g. Device "A" 10, Device "B" 11) each having a Storage 23 that provides persistent memory or storage for the respective computing devices. The system comprises multiple computing devices (e.g. Device "A" 10, Device "B" 11) each having a Transceiver 24 that connects the respective computing devices to the Communications Means 30 and through which communications are transferred between the computing devices. The Device "A" 10 is separate, apart and distinct from the Device "B" 11.

Preferably, the Peer-to-Peer Network Program 40 is connected to a User Interface 20 of a computing device (e.g. the Device "A" 10) which enables the user of the Device "A" 10 to input information to the Peer-to-Peer Network Program 40. The Peer-to-Peer Network Program 40 of a computing device (e.g. the Device "A" 10) can interact with the Peer-to-Peer Network Program 40 of another computing device (e.g. the Device "B" 11).

The present invention pertains to a method to establish a trusted and decentralized peer-to-peer network. The method comprises the step of initially installing the Peer-to-Peer Network Program 40. Then there is preferably the step of creating encryption and decryption keys through means of a CryptoAPI 70 of an Operating System 25. Then there is preferably the step of creating a searchable ciphertext file containing identifiable network information on each computing device embodied by the present invention, which can be shared with each of the other such computing devices. Then there is preferably the step of appending data and/or other information to, or associating data and/or other information with, a specific computer file to be included in the file sharing functionality of the trusted and decentralized peer-to-peer network created by the present invention. Then there is preferably the step of distributing public keys (such as, but not limited to, E-mail, CD-ROM, etc.) from one computing device to the computing devices of other members that belong to a given trusted network, and preparing such public keys for use in the decryption of encrypted files between the members of the trusted peer-to-peer network. Then there is preferably the step of whereby a member of the trusted peer-to-peer network can find other members of the trusted peer-to-peer network through decentralized means. Then there is preferably the step of using the trusted peer-to-peer network for various communications purposes such as, but not limited to: trusted chat sessions, trusted file sharing, etc.

Referring now to the drawings wherein like reference numerals refer to similar or identical parts throughout the several views, and more specifically to FIG. 1 through FIG. 9 thereof, there is shown an apparatus 40 for invoking functionality of the Operating System 25 of computing devices Device "A" 10 and Device "B" 11. The apparatus 40 is connected to the Operating System 25 of computing devices Device "A" 10 and Device "B" 11. The apparatus 40 comprises means for invoking functionality of an Operating System 25 of a computing devices the Device "A" 10 to coordinate with the apparatus 40 of another computing device the Device "B" 11 to: share decryption keys (e.g. UserA Public Key 80, UserB Public Key 81) via electronic or manual means; share encrypted "FindMe" files (e.g. UserA FindMe File 100, UserB FindMe File 101) via open and un-trusted file sharing networks; establish a trusted peer-to-peer network between computing devices Device "A" 10 and Device "B" 11; real-time location of members of the trusted peer-to-peer network; communication between and among computing devices comprising the trusted peer-to-peer network; file sharing between and among computing devices comprising the trusted peer-to-peer network.

FIG. 1 is a schematic diagram which may be used in carrying out the teachings of this invention for the purpose of establishing a trusted and decentralized peer-to-peer network to depict a configuration in which computing devices can be connected to in conjunction with the establishment of a trusted and decentralized peer-to-peer network.

Figure 2A:
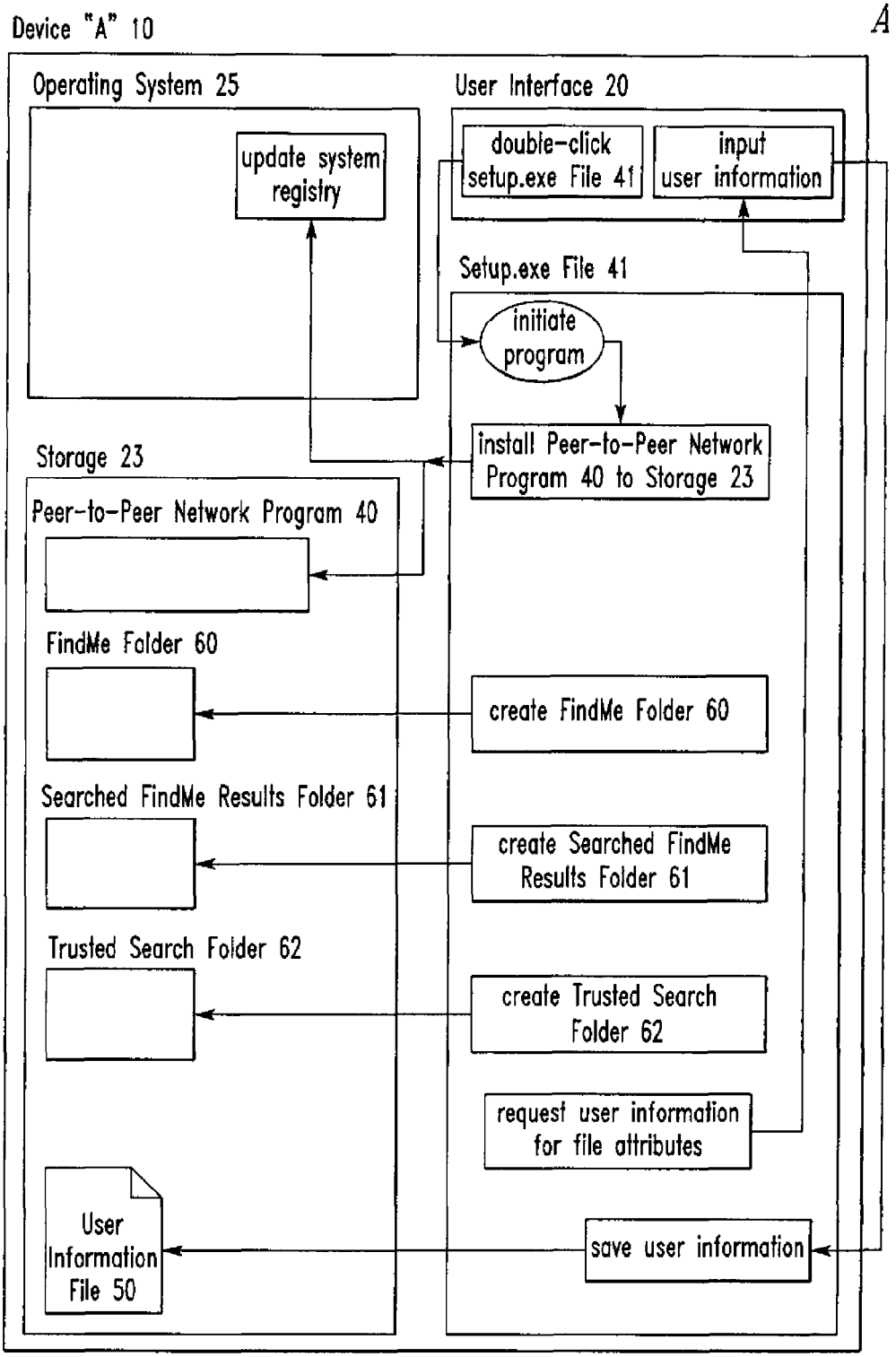
FIG. 2 is a computer programming flowchart.
Figure 2B:
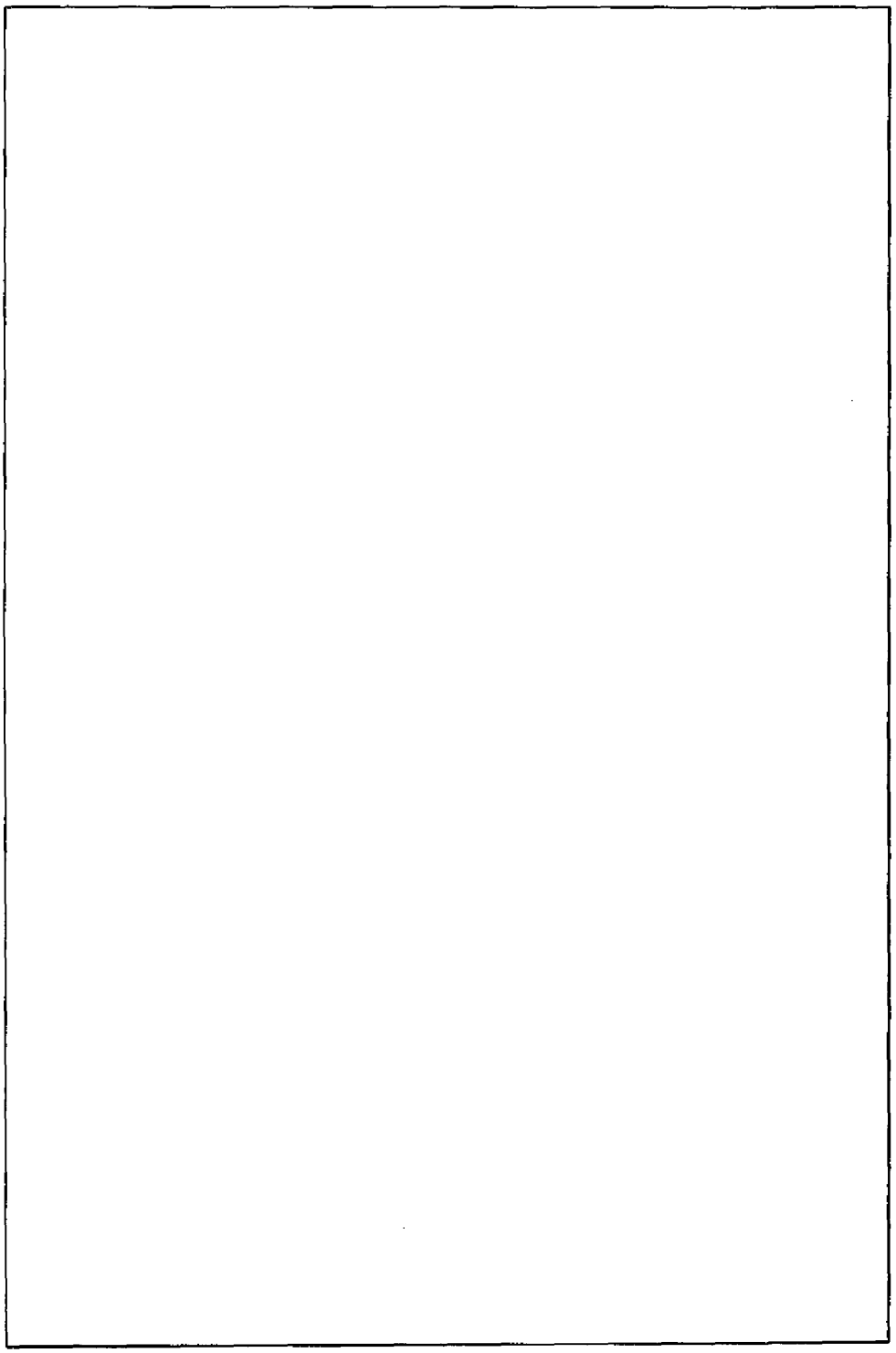

FIG. 2 is a computer programming flowchart which may be used in carrying out the teachings of this invention for the purpose of installing software (e.g. the Peer-to-Peer Network Program 40) which is capable of executing all, or a part, of the teachings of this invention.

Figure 3A:
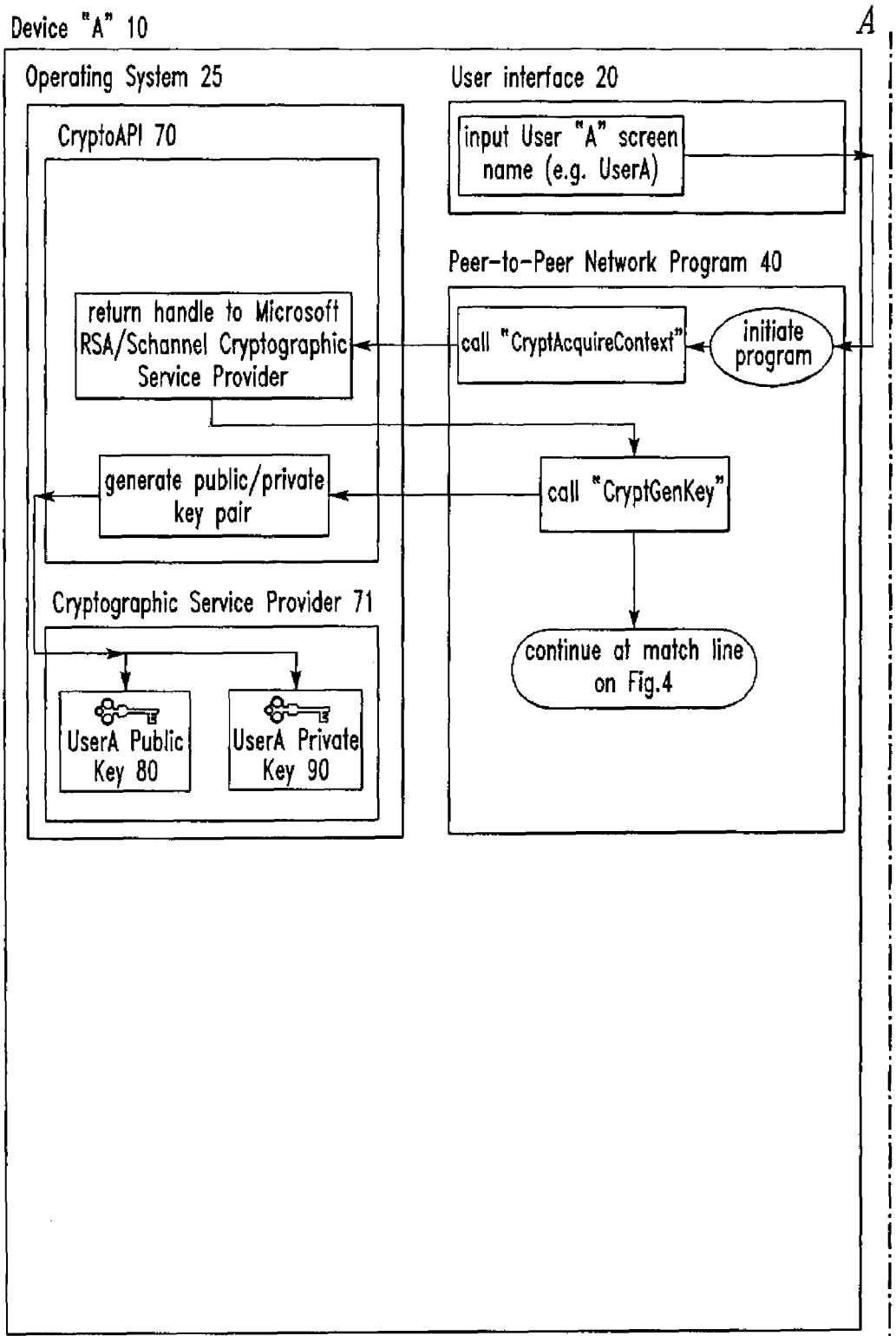
FIG. 3 is a computer programming flowchart.
Figure 3B:
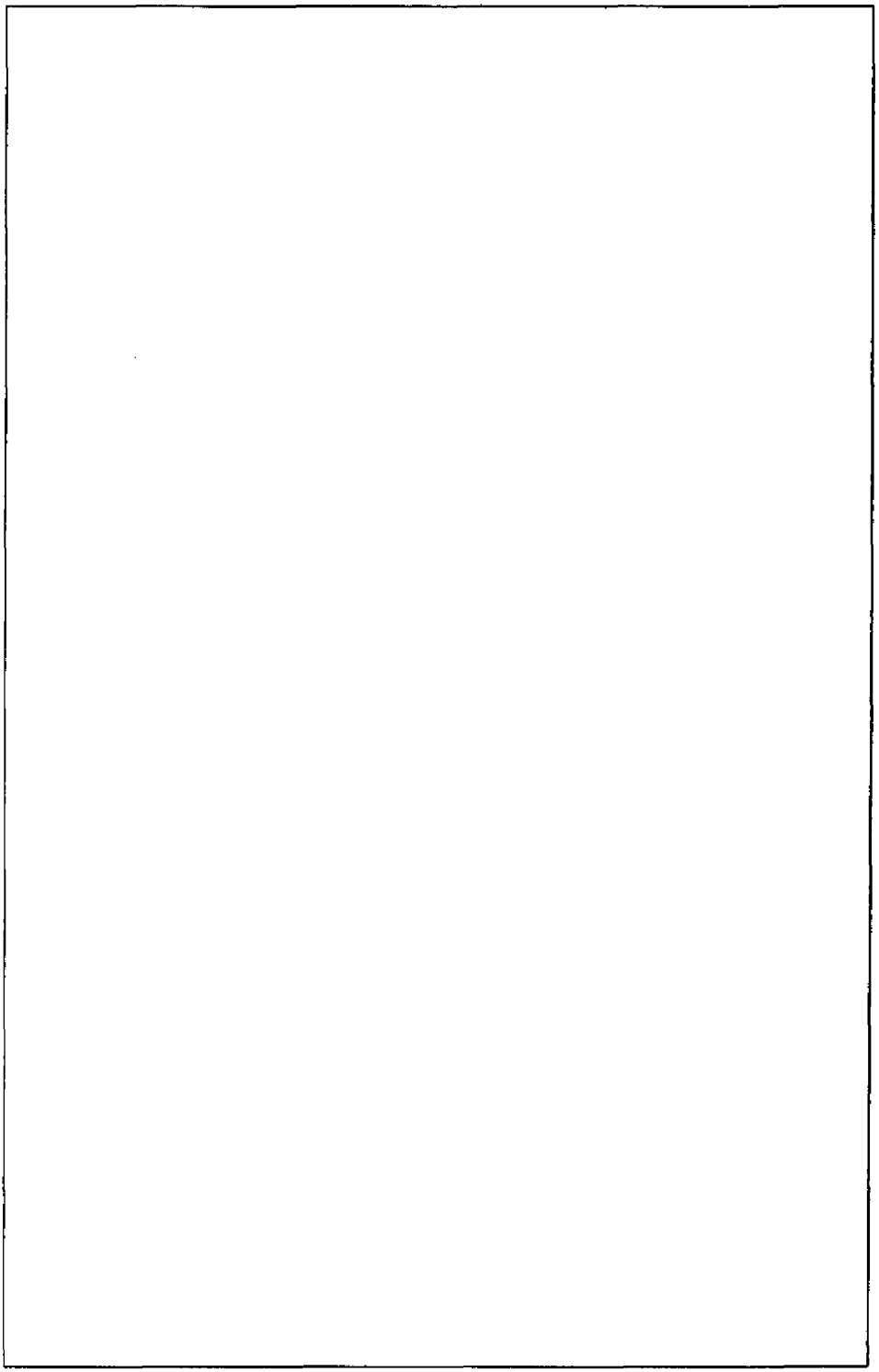

FIG. 3 is a computer programming flowchart which may be used in carrying out the teachings of this invention depicting how the Peer-to-Peer Network Program 40 can be designed to automatically invoke functionality an operating system (e.g. the Operating System 25) to create encryption and decryption keys.

Figure 4A:
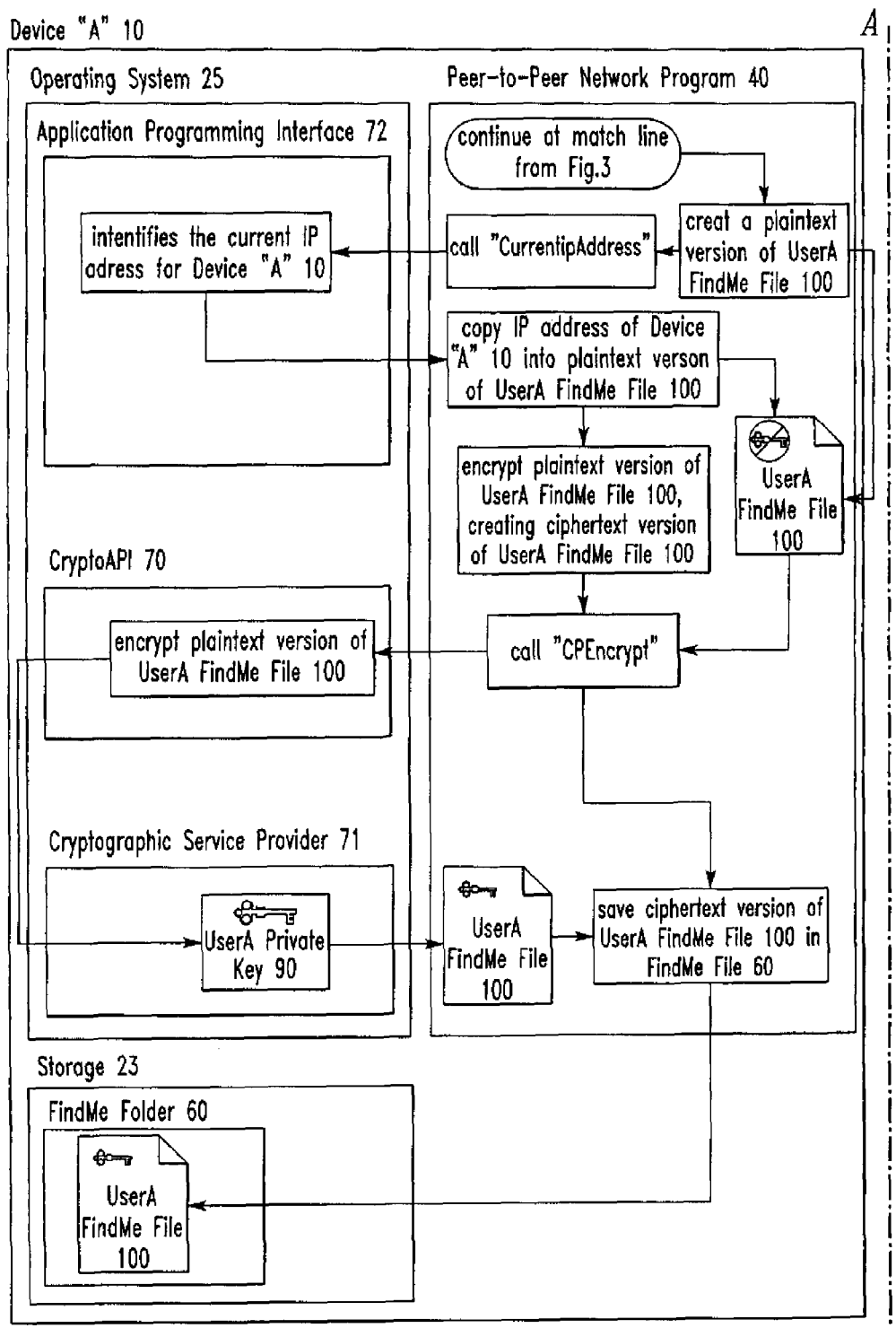
FIG. 4 is a computer programming flowchart.
Figure 4B:
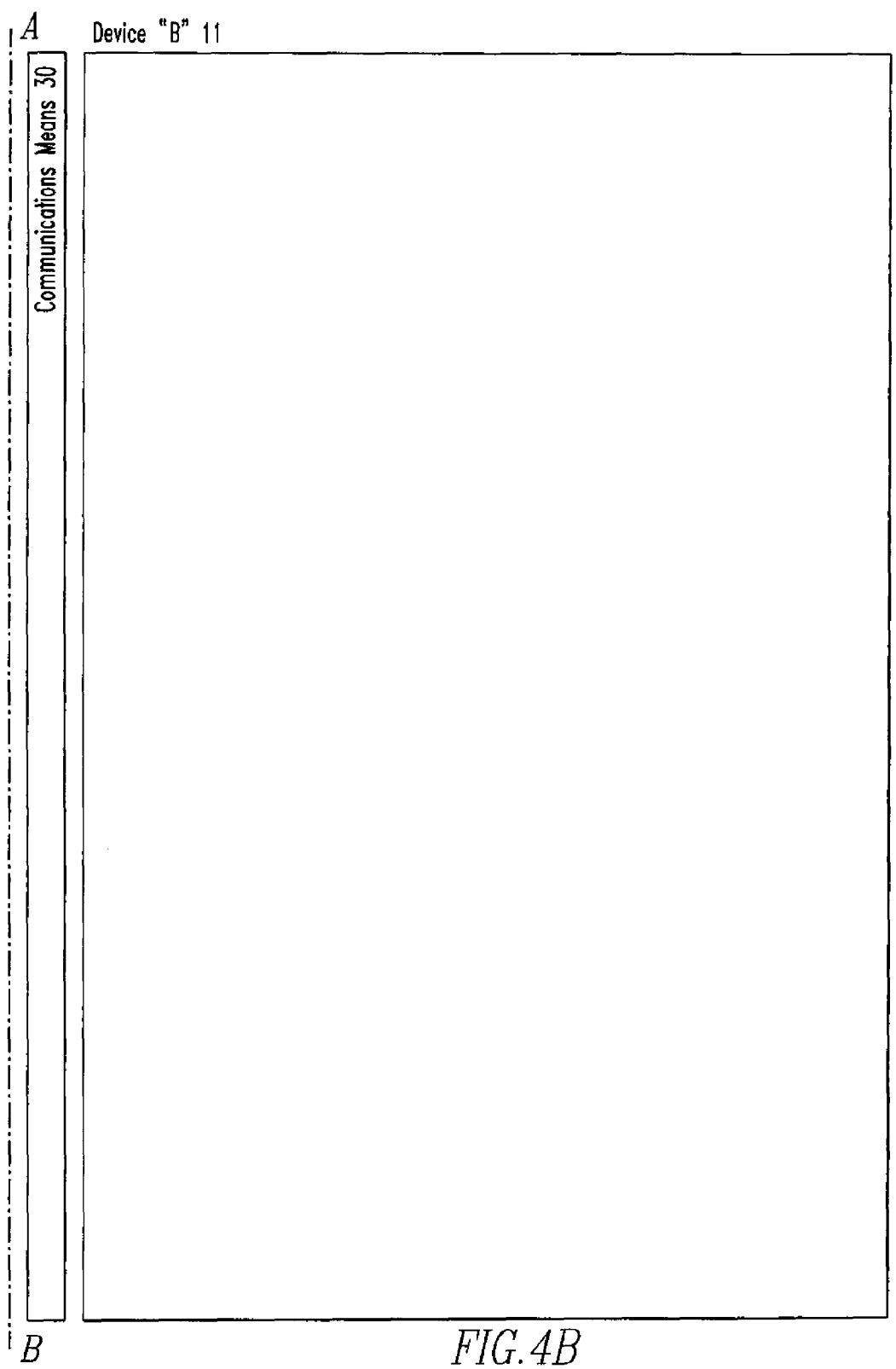

FIG. 4 is a computer programming flowchart which may be used in carrying out the teachings of this invention depicting how the Peer-to-Peer Network Program 40 can be designed to automatically: create searchable ciphertext files containing the information necessary to create a decentralized control procedure for the creation of the trusted peer-to-peer network; permit the user of the computing device to manually input user information; insert into the searchable files peer-to-peer network information derived from an operating system (e.g. the Operating System 25) and insert user information; encrypt the searchable files using encryption keys (see FIG. 3); and saving the encrypted and searchable ciphertext file to a searchable file folder on a storage device (e.g. the Storage 23).

Figure 5A:
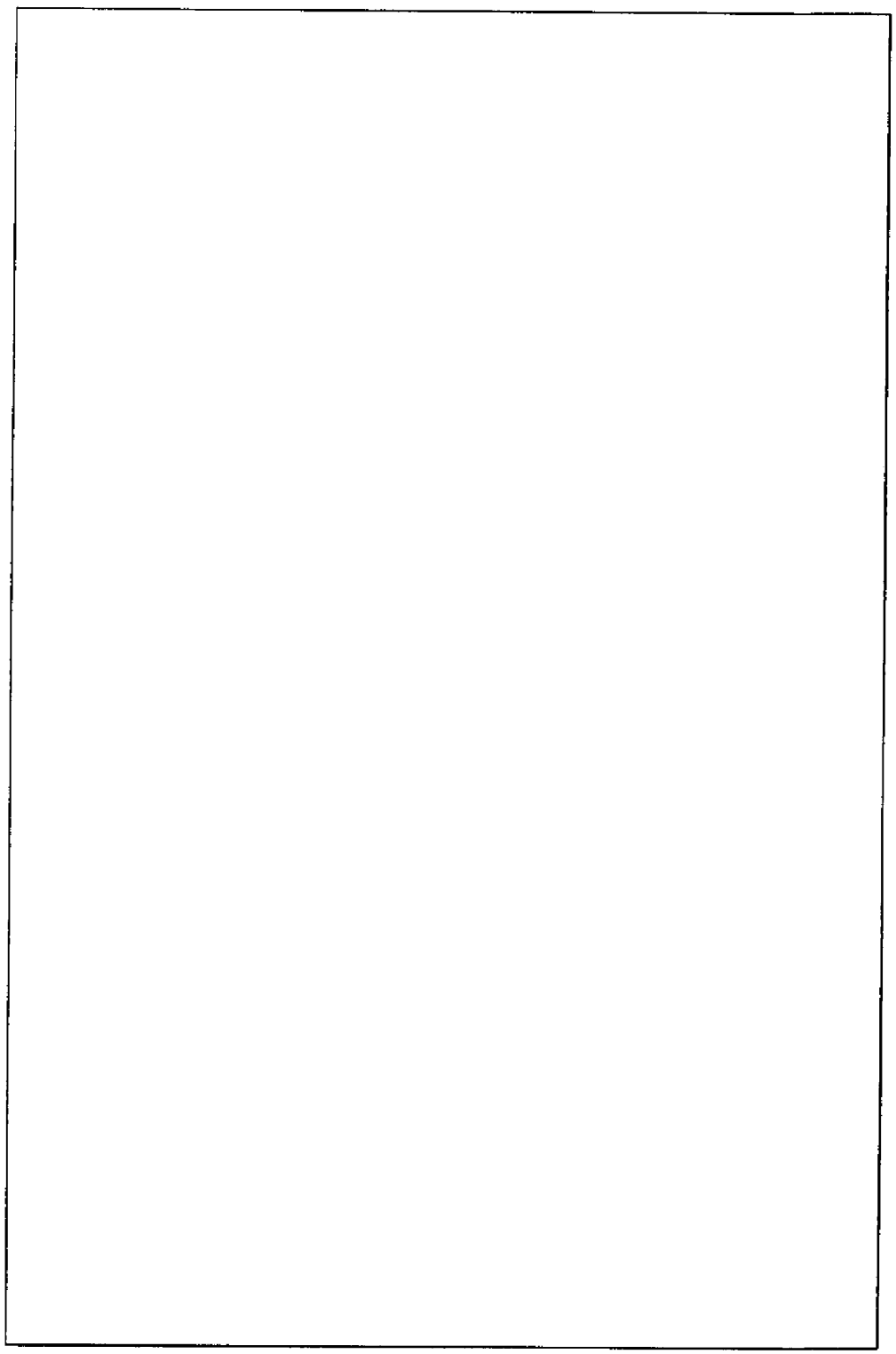
FIG. 5 is a computer programming flowchart.
Figure 5B:
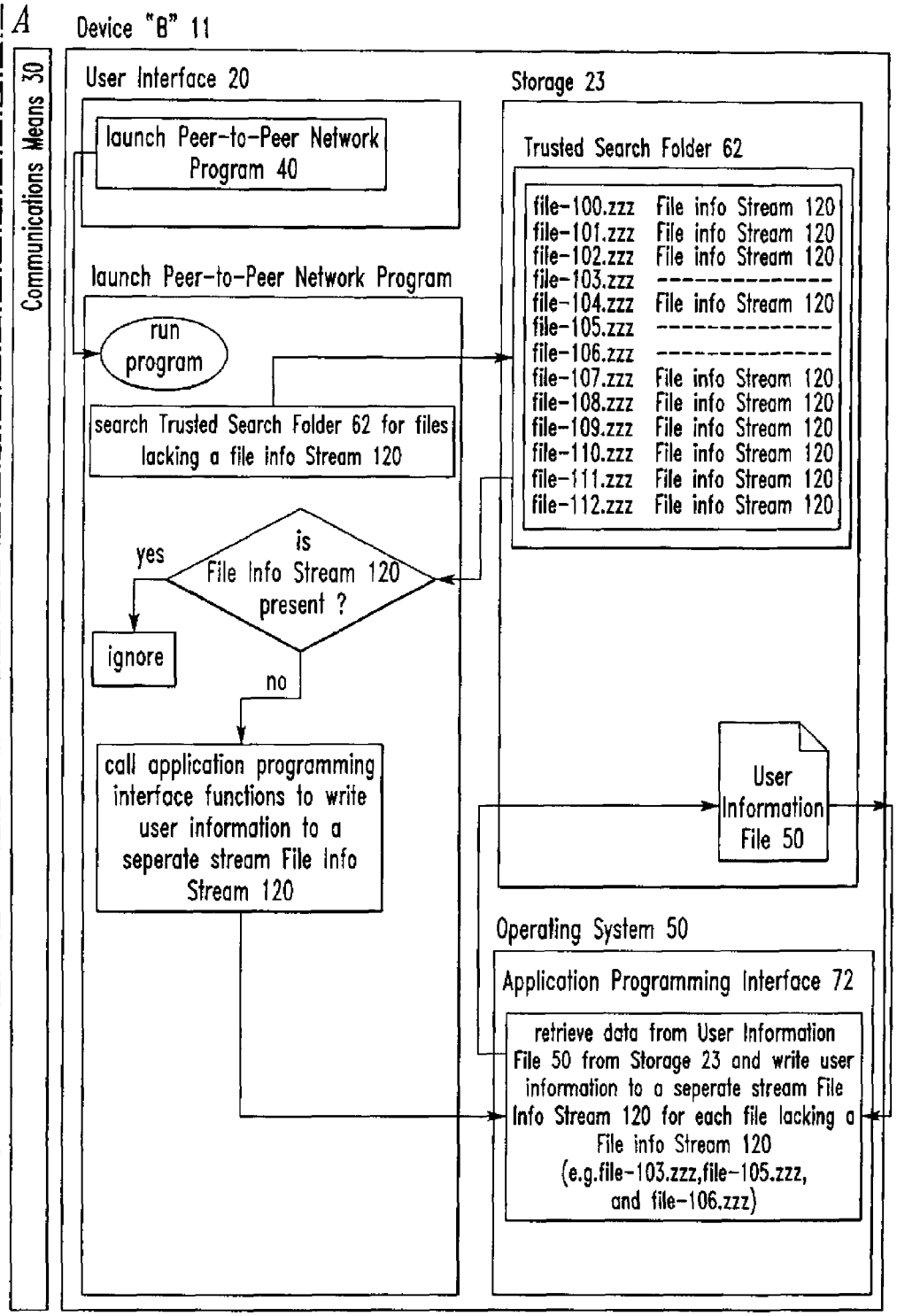

FIG. 5 is a computer programming flowchart which may be used in carrying out the teachings of this invention depicting how the Peer-to-Peer Network Program 40 can be designed to automatically append data and/or information (e.g. file attributes, file properties, etc.) to a computer file.

Figure 6A:
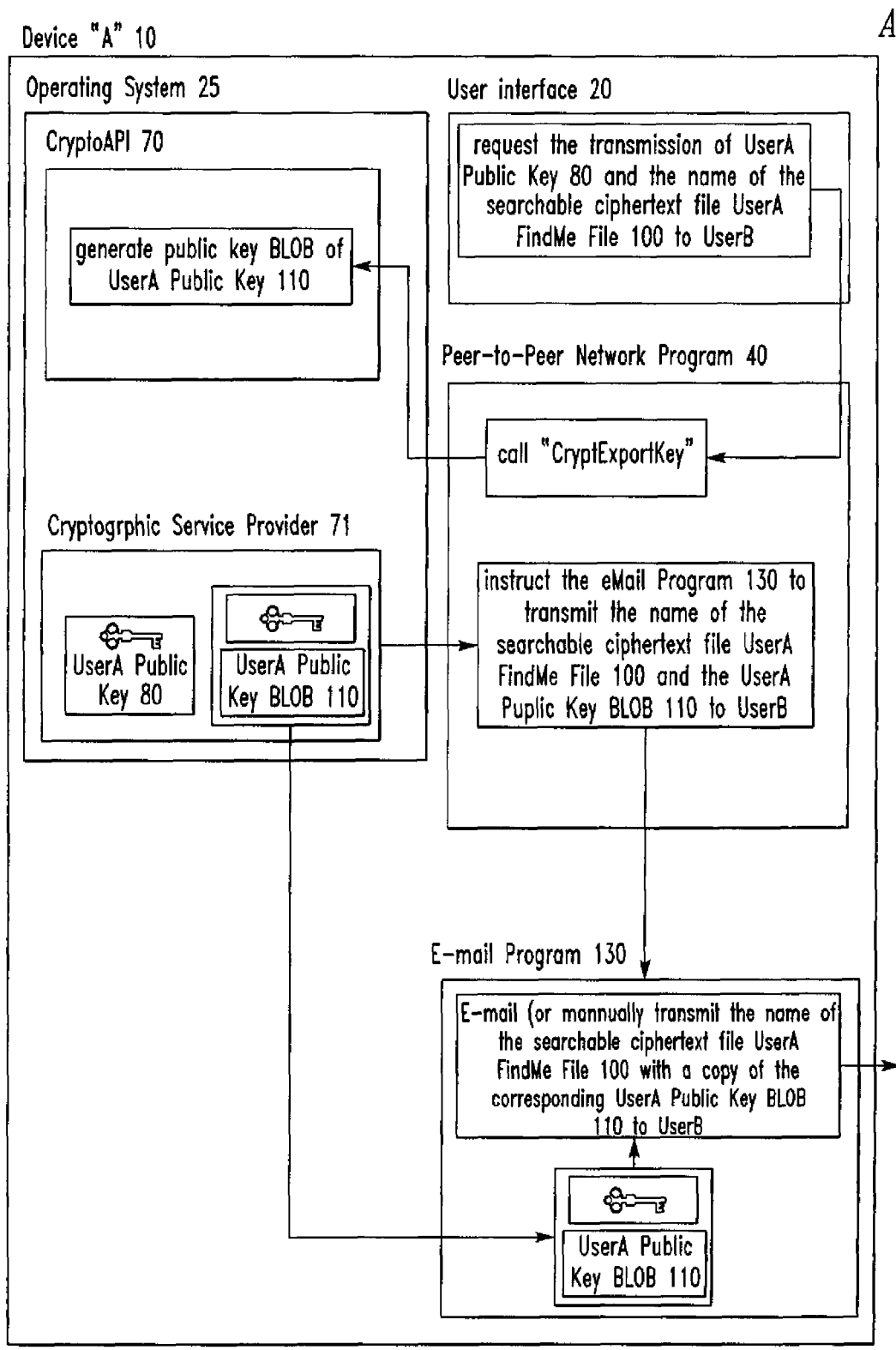
FIG. 6 is a computer programming flowchart.
Figure 6B:
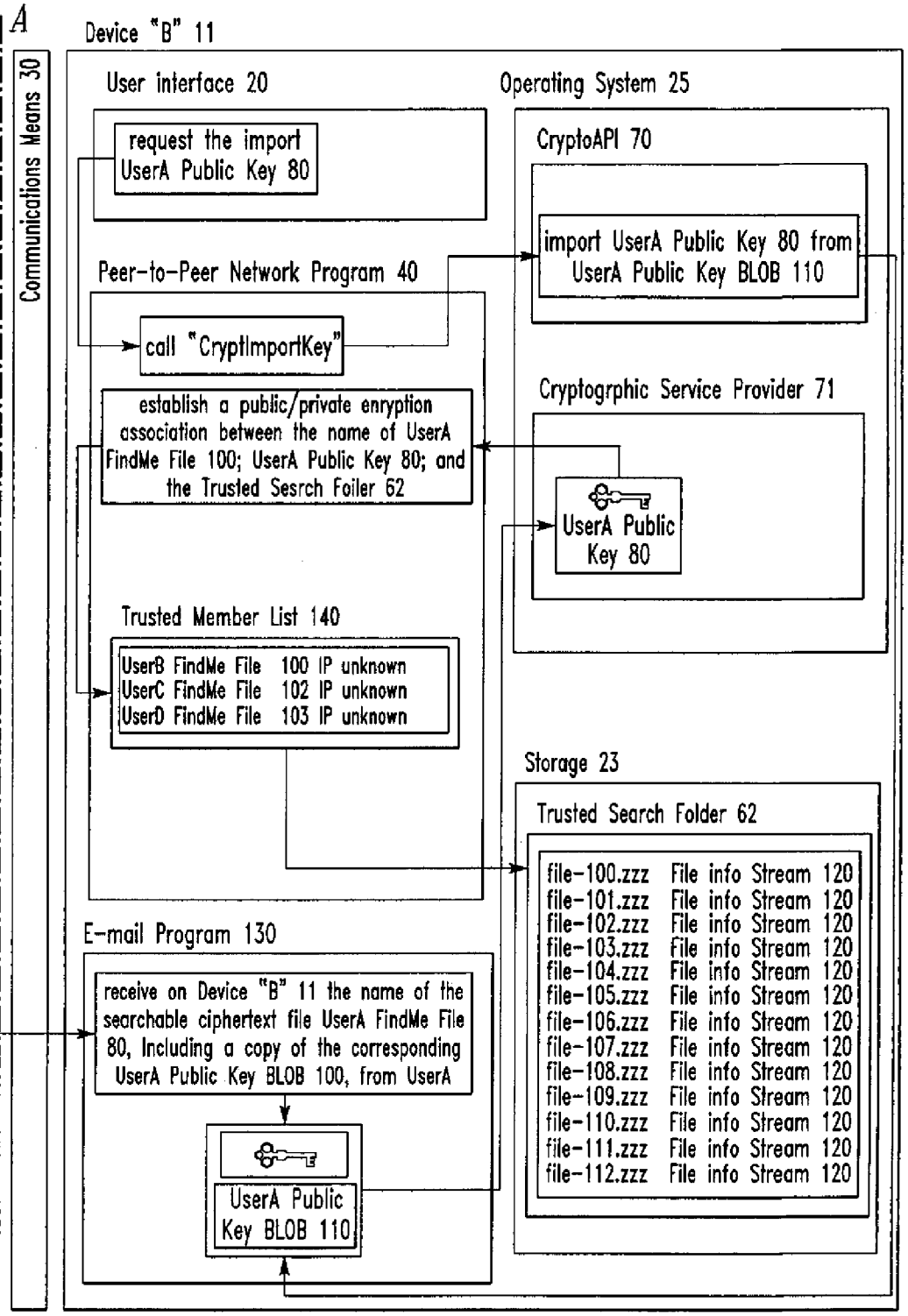

FIG. 6 is a computer programming flowchart which may be used in carrying out the teachings of this invention depicting how the Peer-to-Peer Network Program 40 can assist the user of a computing device to automatically distribute decryption keys (e.g. the public keys) to user specified recipients (e.g. members of the trusted peer-to-peer network).

Figure 7A:
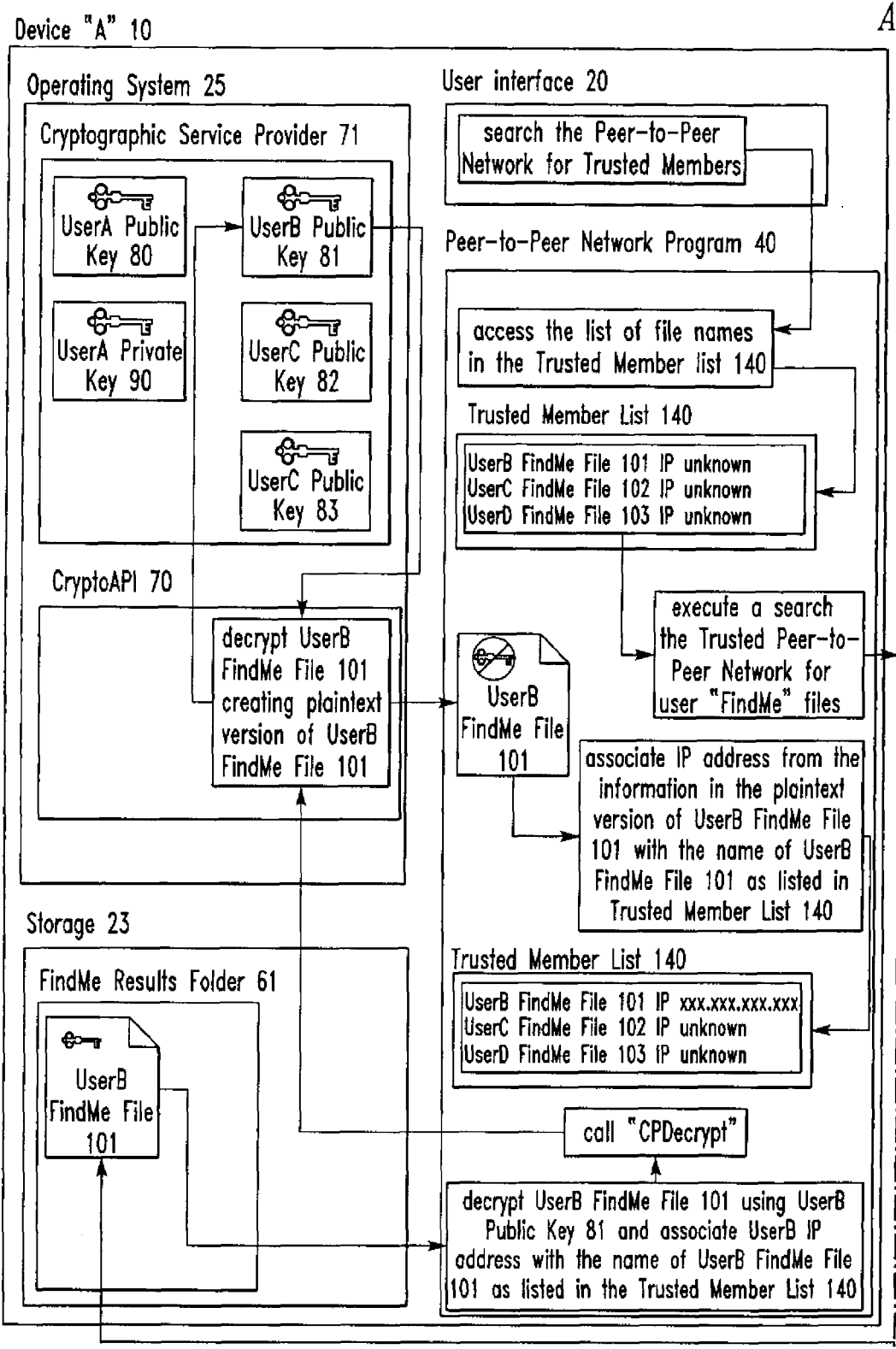
FIG. 7 is a computer programming flowchart.
Figure 7B:
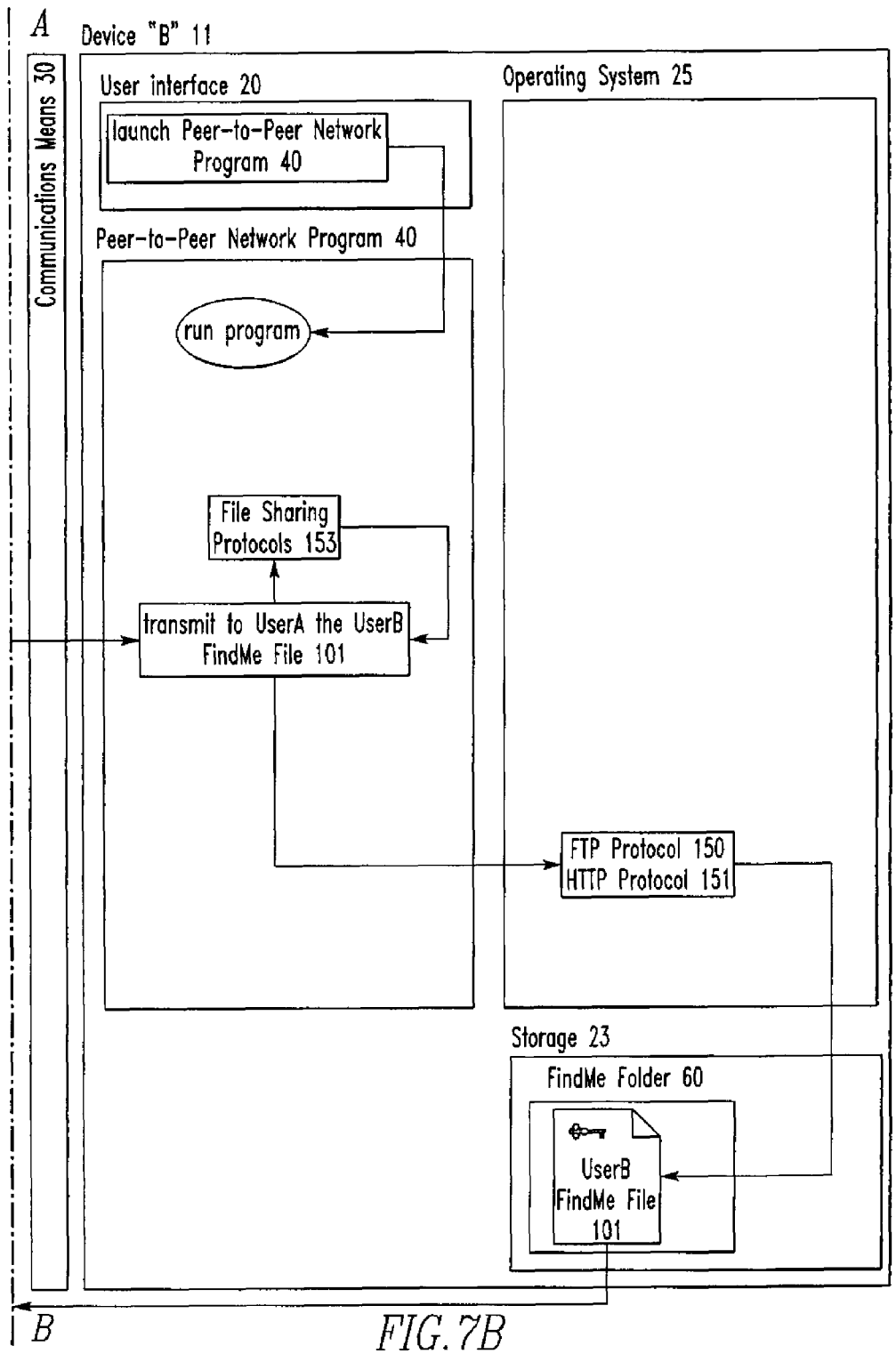

FIG. 7 is a computer programming flowchart which may be used in carrying out the teachings of this invention depicting how the Peer-to-Peer Network Program 40 can automatically: search an open (non-trusted) file sharing network for computer files (e.g. UserA FindMe File 100) containing network information (e.g. IP address) pertaining to computing devices controlled or operated by specific and previously known users (e.g. members of the trusted peer-to-peer network); download a copy of one or more of the computer files (e.g. UserA FindMe File 100); decrypt the computer files (e.g. UserA FindMe File 100); extract the network information (e.g. IP address); and associate the network information (e.g. IP address) with the specific and previously known users (e.g. members of the trusted peer-to-peer network) respectively in a trusted member list (e.g. the Trusted Member List 140).

Figure 8A:
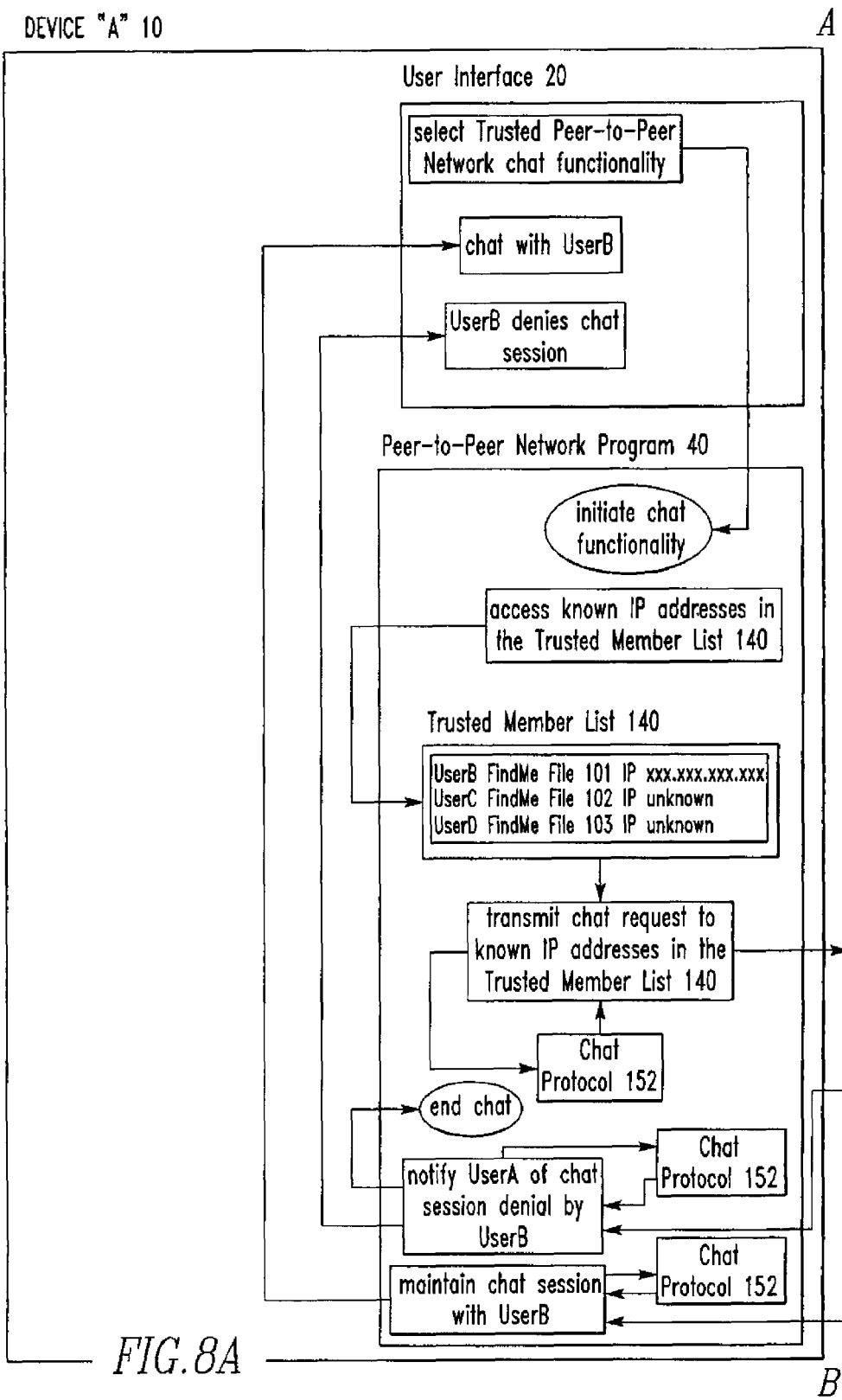
FIG. 8 is a computer programming flowchart.

FIG. 8 is a computer programming flowchart which may be used in carrying out the teachings of this invention depicting how the Peer-to-Peer Network Program 40 can automatically invoke the functionality of communications protocols (e.g. the Chat Protocol 152) to establish a chat session with specific and previously known users (e.g. members of the trusted peer-to-peer network).

Figure 9A:
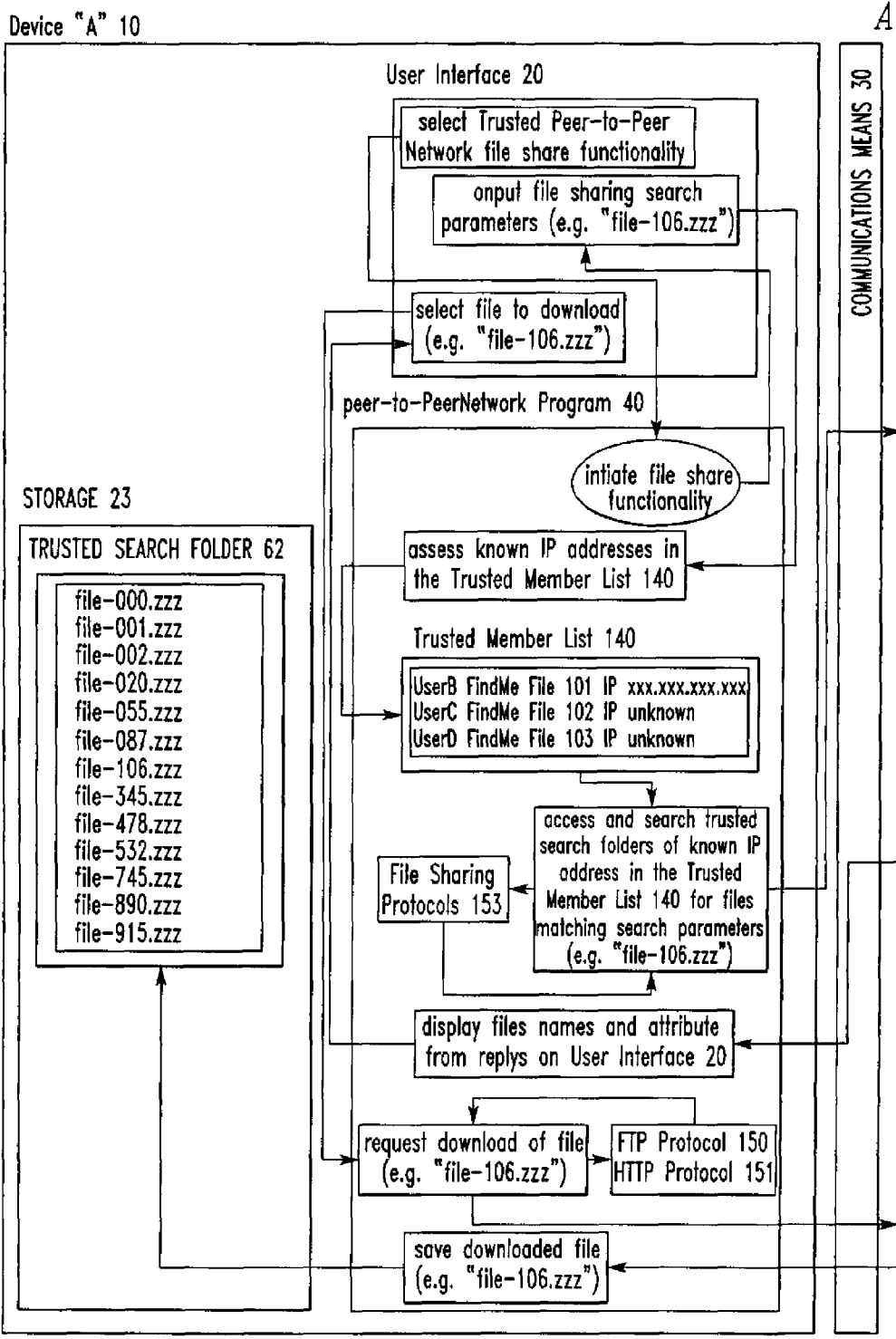
FIG. 9 is a computer programming flowchart.
Figure 9B:
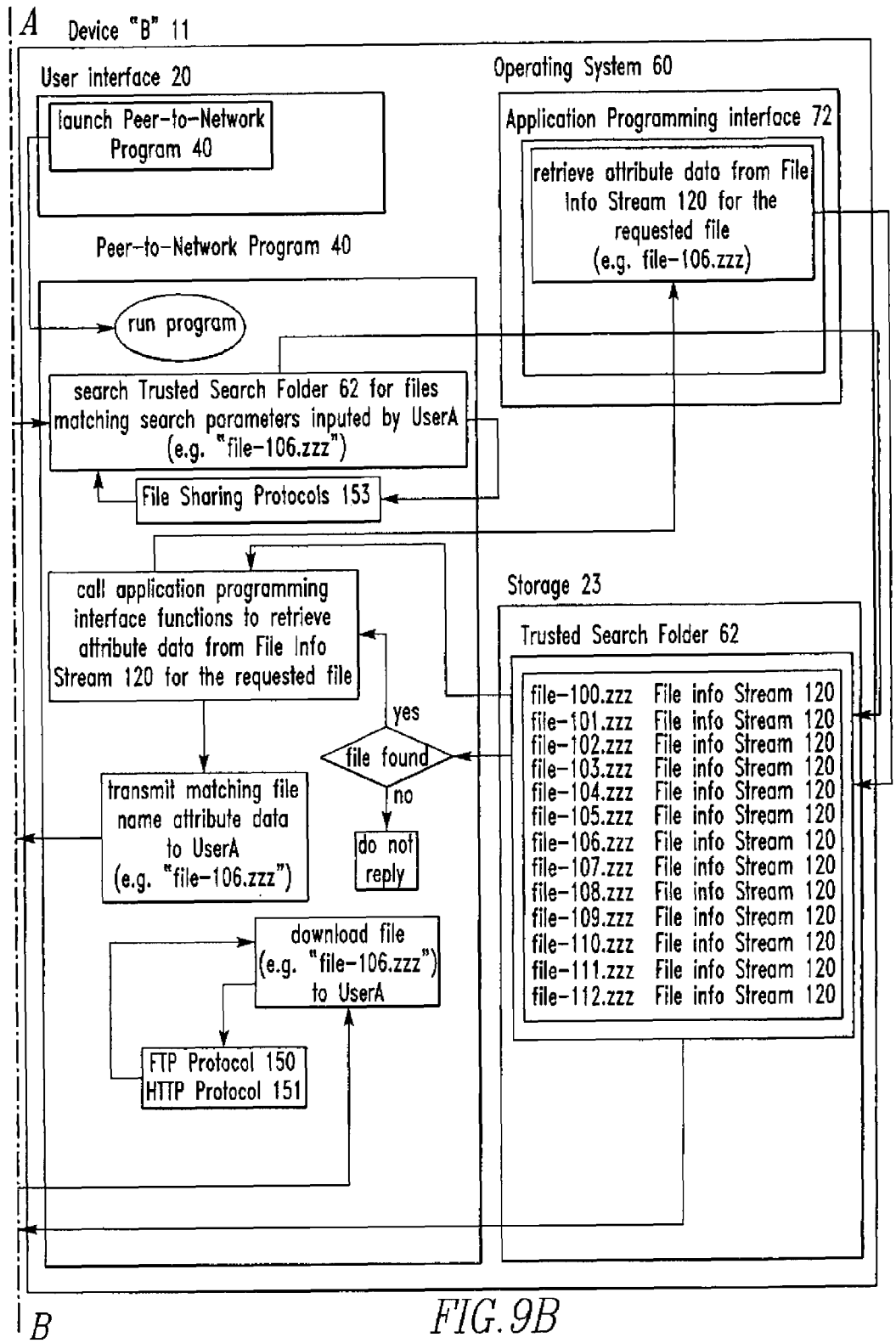

FIG. 9 is a computer programming flowchart which may be used in carrying out the teachings of this invention depicting how the Peer-to-Peer Network Program 40 can automatically: establish a trusted peer-to-peer network using a the IP addresses in the Trusted Member List 140; invoke the functionality of communications protocols (e.g. the File Sharing Protocols 153) to execute computer file searches on, and retrieval from, computing devices controlled or operated by users listed on the Trusted Member List 140.

Referring now to FIG. 1 through FIG. 9, a preferred embodiment of the invention is comprised of the following:
10 Device "A"
11 Device "B"
12 Device "C"
13 Device "D"
20 User Interface
21 Processor
22 RAM
23 Storage
24 Transceiver
25 Operating System
30 Communications Means
41 Setup.exe File
40 Peer-to-Peer Network Program 40
50 User Information File
60 FindMe Folder
61 Searched FindMe Results Folder
62 Trusted Search Folder
70 CryptoAPI
71 Cryptographic Service Provider
72 Application Programming Interface
80 UserA Public Key
81 UserB Public Key
82 UserC Public Key 83 UserD Public Key
90 UserA Private Key
91 UserB Private Key
92 UserC Private Key
93 UserD Private Key
100 UserA FindMe File
101 UserB FindMe File
102 UserC FindMe File
103 UserD FindMe File
110 UserA Public Key BLOB
111 UserB Public Key BLOB
112 UserC Public Key BLOB
113 UserD Public Key BLOB
120 File Info Stream
130 E-mail Program
140 Trusted Member List
150 FTP Protocol
151 HTTP Protocol
152 Chat Protocol
153 File Sharing Protocols In FIG. 1 through FIG. 9, the following components are already commercially available: the Device "A" 10, the Device "B" 11, the Device "C" 12, the Device "D" 13, the User Interface 20, the Processor 21, the RAM 22, the Storage 23, the Transceiver 24, the Operating System 25, the Communications Means 30, the CryptoAPI 70, the Cryptographic Service Provider 71, the Application Programming Interface 72, the UserA Public Key 80, the UserB Public Key 81, the UserC Public Key 82, the UserD Public Key 83, the UserA Private Key 90, the UserB Private Key 91, the UserC Private Key 92, the UserD Private Key 93, the UserA Public Key BLOB 110, the UserB Public Key BLOB 111, the UserC Public Key BLOB 112, the UserD Public Key BLOB 113, the E-mail Program 130, the FTP Protocol 150, the HTTP Protocol 151, the Chat Protocol 152, and the File Sharing Protocols 153. The Peer-to-Peer Network Program 40, the Setup.exe File 41, the User Information File 50, the FindMe Folder 60, the Searched FindMe Results Folder 61, the Trusted Search Folder 62, the UserA FindMe File 100, the UserB FindMe File 101, the UserC FindMe File 102, the UserD FindMe File 103, the File Info Stream 120, and the Trusted Member List 140, are new teachings of this invention.

The Device "A" 10, the Device "B" 11, the Device "C" 12, the Device "D" 13 are means, which can perform computational functions (such as, but not limited to, a Web Server, PC, Mac, PalmPC, Laptop, etc.). The Device "A" 10, the Device "B" 11, the Device "C" 12, the Device "D" 13 are also means, which can electronically communicate with other computing devices. The Device "A" 10, the Device "B" 11, the Device "C" 12, the Device "D" 13 are also means to transmit computer files (e.g. the UserA FindMe File 100) to other computing devices. The Device "A" 10, the Device "B" 11, the Device "C" 12, the Device "D" 13 are also means to transmit information and/or requests to other computing devices. The Device "A" 10, the Device "B" 11, the Device "C" 12, the Device "D" 13 may contain a video display, audio speakers, and other computing peripherals. The present invention is not limited to only the Device "A" 10, the Device "B" 11, the Device "C" 12, and the Device "D" 13.

The User Interface 20 (such as, but not limited to, web browser software such as the Microsoft Internet Explorer, keyboard, mouse, video monitor, speakers) is means, which the user of a computer device (e.g. Device "A" 10) can interface with the computing device. The User Interface 20 is means, which can be used by the user of the computing device to transmit requests to another computing device and can display the contents of the User Interface 20 to the user of the computing device. The User Interface 20 is means, which can receive and execute requests transmitted from another computing device. The User Interface 20 is also means, which is a client program that can use the hypertext transfer protocol ("HTTP") to make requests of a plurality of devices (e.g. Device "A" 10) throughout the Internet on behalf of the user of any other device of devices (e.g. Device "C" 12).

The Processor 21 is means of a computing device (e.g. Device "A" 10, Device "B" 11, Device "C" 12, and Device "D" 13) to electronically process instructions of the Operating System 25, other computer programs running on the Operating System 25 or other computer peripheral devices of the computing device (e.g. Device "A" 10, Device "B" 11, Device "C" 12, and Device "D" 13). The Processor 21 is also means of a computing device (e.g. Device "A" 10, Device "B" 11, Device "C" 12, and Device "D" 13) to electronically process instructions of other peripheral software and/or firmware devices of the a computing device.

The RAM 22 is means used by the Operating System 25 of a computing device (e.g. Device "A" 10, Device "B" 11, Device "C" 12, and Device "D" 13) to temporarily store computer files, computer programs or other computer information (such as, but not limited to, the UserA FindMe File 100) for use by the Operating System 25, computer programs running on the Operating System 25 or other computer peripheral devices of the computing devices.

The Storage 23 is means in, or connected to, a computing device (e.g. Device "A" 10, Device "B" 11, Device "C" 12, and Device "D" 13), which can be used to electronically save an electronic copy of the digital code of a computer program or computer file (such as, but not limited to, the UserA FindMe File 100) from RAM 22 of the a computing device.

The Transceiver 24 (such as, but not limited to a telephone modem, cable modem, network interface card, etc.) is means to electronically send and receive communication signals via a Communications Means 30. The Transceiver 24 is means used by software and/or firmware of, or connected to, a computing device (e.g. Device "A" 10, Device "B" 11, Device "C" 12, and Device "D" 13) and/or the Operating System 25 thereof, to electronically communicate via a Communications Means 30. The Transceiver 24 is connected to a computing device (e.g. Device "A" 10, Device "B" 11, Device "C" 12, and Device "D" 13) and is connected to the Communications Means 30.

The Operating System 25 (such as, but not limited to, Microsoft Windows 2000) is means to permit computing functionality of a computing device (e.g. Device "A" 10, Device "B" 11, Device "C" 12, and Device "D" 13).

The Communications Means 30 (such as, but not limited to, telephone lines, cable TV lines, coax cable, fiber optics, radio, cellular, satellite, serial cables, parallel cables, infrared communication, laser communication, universal serial bus (USB) cables, the Internet, LAN, Ethernet, network generally, etc.) is means by which computing devices connected thereto can electronically communicate. The Communications Means 30 is also means by which computing devices connected thereto can invoke standard communication protocols (such as, but not limited to, hypertext transfer protocol (HTTP); file transfer protocol (FTP); etc.) to transmit and receive signals and/or computer programs or computer files (such as, but not limited to, the UserA FindMe File 100). The Communications Means 30 is also means by which computing devices connected thereto can invoke encrypted communication protocols (such as, but not limited to, secure sockets layer (SSL), transport layer security (TLS), virtual private network (VPN), etc.) to transmit and receive encrypted signals. The Communications Means 30 is also means which can include a worldwide system of computer networks, or a network of networks, known as the "Internet" in which users at any one computing device can get information from any other computer device. The Communications Means 30 is connected to the Transceiver 70, a computing device (e.g. Device "A" 10, Device "B" 11, Device "C" 12, and Device "D" 13).

The Peer-to-Peer Network Program 40 is means, which can operate on a plurality of computing devices (e.g. Device "A" 10, Device "B" 11, Device "C" 12, and Device "D" 13). The Peer-to-Peer Network Program 40 is also means to instruct the Operating System 25, or a communication program thereof, to communicate with another computing device (e.g. Device "C" 12) via Communications Means 30. The Peer-to-Peer Network Program 40 of a computing device (e.g. Device "D" 13) is also means to instruct the Peer-to-Peer Network Program 40 of a computing device (e.g. Device "A" 10) to transmit queries or instructions to the Operating System 25 of the Device "A" 10 during the execution of the functionality of the Peer-to-Peer Network Program 40 of the Device "A" 10 and the Device "D" 13. The Peer-to-Peer Network Program 40 of a computing device (e.g. Device "D" 13) is also means to receive instructions from the Peer-to-Peer Network Program 40 of a computing device (e.g. Device "A" 10) via Communications Means 30. The Peer-to-Peer Network Program 40 of a computing device (e.g. Device "A" 10) is also means to automatically receive from transmission, a computer file (e.g. the UserC FindMe File 102) transmitted from another computer device (e.g. Device "C" 12) via a Communications Means 30 and place an electronic copy thereof in RAM 22 on the first computing device (e.g. Device "A" 10). The Peer-to-Peer Network Program 40 is also means to automatically instruct the Operating System 25 of a computing device (e.g. Device "A" 10) to recall a computer file (e.g. the UserC FindMe File 102) from RAM 22 and save an electronic copy thereof to Storage 23. The Peer-to-Peer Network Program 40 is means to transmit a message to the User Interface 20 of a computing device (e.g. Device "A" 10) upon completion of the execution of the functionality of the Peer-to-Peer Network Program 40. The Peer-to-Peer Network Program 40 is also means to enable users of computing devices (e.g. Device "A" 10, Device "B" 11, Device "C" 12, and Device "D" 13) to establish a trusted communications network. The Peer-to-Peer Network Program 40 is also means to enable users of computing devices (e.g. Device "A" 10, Device "B" 11, Device "C" 12, and Device "D" 13) to utilize the trusted communications network to establish a communications session (e.g. a chat session). The Peer-to-Peer Network Program 40 is also means to enable users of computing devices (e.g. Device "A" 10, Device "B" 11, Device "C" 12, and Device "D" 13) to utilize the trusted communications network to share files between the computing devices. The Peer-to-Peer Network Program 40 is also means to utilize communications protocols (e.g. the FTP Protocol 150) to automatically transmit a computer file (e.g. the UserA FindMe File 100) to other computing devices, operating with the Peer-to-Peer Network Program 40, via Communications Means 30. The Peer-to-Peer Network Program 40 may be embodied in computer coding software (such as, but not limited to, a program authored in the computer language C++, C#, Active Server Pages, XML, Visual Basic, ActiveX Controls, Java Script, etc.) to execute the described functions.

The Setup.exe File 41 is means, which can be transmitted to a computing device (e.g. Device "A" 10, Device "B" 11, Device "C" 12, and Device "D" 13) via various means (e.g. via download, CD-ROM, etc.). The Setup.exe File 41 is means, which functionality can be invoked by a user of a computing device by a common process of "double clicking" on the file itself. The Setup.exe File 41 is means, which contains a copy of the Peer-to-Peer Network Program 40. The Setup.exe File 41 is means, which automatically installs the Peer-to-Peer Network Program 40 on a computing device (e.g. Device "A" 10, Device "B" 11, Device "C" 12, and Device "D" 13) and makes the necessary modifications to the Operating System 25 of the computing device necessary for proper functioning of the Peer-to-Peer Network Program 40.

The User Information File 50 is a computer file (such as, but not limited to, a text document, etc.) which is created by the Peer-to-Peer Network Program 40 from information manually inputted by the user of the computing device (e.g. Device "A" 10, Device "B" 11, Device "C" 12, and Device "D" 13) running the copy of the Peer-to-Peer Network Program 40. The User Information File 50 is also a computer file, which can include information specific to the host computing device, which the information can be automatically collected by the Peer-to-Peer Network Program 40 utilizing the Application Programming Interface 72 of the host Operating System 25.

The FindMe Folder 60 is the folder location in the Storage 23 of the host computing device (e.g. Device "B" 11) where a searchable file (e.g. UserB FindMe File 101) containing trusted network information on the computing device, and the user thereof, is to be saved. The FindMe Folder 60 is created by the Setup.exe File 41 upon initial installation of the Peer-to-Peer Network Program 40. The FindMe Folder 60 can also be created by the Peer-to-Peer Network Program 40 after the initial installation of the Peer-to-Peer Network Program 40, either automatically or upon request by the respective user. Multiple FindMe Folders 60 can be present on each computing device containing an embodiment of this invention.

The Searched FindMe Results Folder 61 is the folder location in the Storage 23 of the host computing device (e.g. Device "B" 11) where computer files (e.g. UserA FindMe File 100, UserC FindMe File 102, UserD FindMe File 103) resulting from specific search queries performed by the Peer-to-Peer Network Program 40 are to be saved by the Peer-to-Peer Network Program 40. The Searched FindMe Results Folder 61 is created by the Setup.exe File 41 upon initial installation of the Peer-to-Peer Network Program 40. The Searched FindMe Results Folder 61 can also be created by the Peer-to-Peer Network Program 40 after the initial installation of the Peer-to-Peer Network Program 40, either automatically or upon request by the respective user. Multiple Searched FindMe Results Folders 61 can be present on each computing device containing an embodiment of this invention.

The Trusted Search Folder 62 is the folder location in the Storage 23 of the host computing device (e.g. Device "B" 11) where computer files (e.g. documents, spreadsheets, audio files (e.g. ASF, WMA, MP3, WAV, AUI), video files (e.g. ASF, WMv, AVI, MPEG), executable programs (e.g. EXE), etc.) resulting from specific search queries performed by the Peer-to-Peer Network Program 40 are to be saved by the Peer-to-Peer Network Program 40. The Trusted Search Folder 62 can be searched by other computing devices running a copy of the Peer-to-Peer Network Program 40. The Trusted Search Folder 62 can be searched by other computing devices running a copy of the Peer-to-Peer Network Program 40 utilizing File Sharing Protocols 153. The Trusted Search Folder 62 is created by the Setup.exe File 41 upon initial installation of the Peer-to-Peer Network Program 40. The Trusted Search Folder 62 can also be created by the Peer-to-Peer Network Program 40 after the initial installation of the Peer-to-Peer Network Program 40, either automatically or upon request by the respective user. Multiple Trusted Search Folders 62 can be present on each computing device containing an embodiment of this invention.

The CryptoAPI 70 is means of an operating system (e.g. the Operating System 25), which enables computer programs and/or applications to execute cryptographic functions of the operating system (e.g. the Microsoft® CryptoAPI, an application programming interface). The CryptoAPI 70 is also means of an Operating System 25, which contains cryptographic functionality and which the Peer-to-Peer Network Program 40 can utilize to execute encrypting and decrypting functions. The CryptoAPI 70 is also means of an Operating System 25, which includes functionality for encrypting and decrypting data, and for authentication using digital certificates. The CryptoAPI 70 is also means of an Operating System 25, which provides certificate management functions maintaining and managing a persistent storage of certificates, public keys, and private keys in a certificate store (e.g. the Cryptographic Service Provider 71). The CryptoAPI 70 is also means of an Operating System 25, which contains functions that can incorporate certificates in outgoing transmissions and/or messages and verify digital certificates that are being received in received transmissions and/or messages.

The Cryptographic Service Provider 71 is means of the CryptoAPI 70, which stores public/private key pairs from session to session in persistent memory (e.g. the Microsoft® CSP). The Cryptographic Service Provider 71 is also means of the CryptoAPI 70, which can store public/private key pairs, in encrypted form, in the system registry of the operating system (e.g. the Operating System 25).

The Application Programming Interface 72 is means of an operating system (e.g. the Operating System 25), which enables the Peer-to-Peer Network Program 40 to programmatically retrieve specific information about the host computer (e.g. the Microsoft® Win32 API). The Application Programming Interface 72 is also means of an operating system (e.g. the Operating System 25), which enables the Peer-to-Peer Network Program 40 to programmatically retrieve specific IP address information about the network configuration of the host computer. The Application Programming Interface 72 may include functionality of the CryptoAPI 70, the Cryptographic Service Provider 71, and other similar application programming interfaces.

The UserA Public Key 80 is means, which is used to decrypt files that have been encrypted with that certain private key (e.g. UserA Private Key 90) which forms the public/private key pair with the UserA Public Key 80. The UserA Public Key 80 is also means, which is created by the Peer-to-Peer Network Program 40 using the CryptoAPI 70. The UserA Public Key 80 is also means, which can be stored in persistent memory on the Storage 23 of the host computing device (e.g. Device "A" 10) by the Cryptographic Service Provider 71. The UserA Public Key 80 is also means, which can be transmitted to another computing device (e.g. Device "B" 11, Device "C" 12, and Device "D" 13) via various means (e.g. via Communications Means 30, floppy disk, E-mail Program 130, etc.). The UserA Public Key 80 is also means, which can be stored in persistent memory on the Storage 23 of other computing device (e.g. Device "B" 11, Device "C" 12, and Device "D" 13) by the Cryptographic Service Provider 71. The UserA Public Key 80 is also means, which can decrypt files on other computing device (e.g. Device "B" 11, Device "C" 12, and Device "D" 13), that have been encrypted with that certain private key (e.g. UserA Private Key 90).

The UserB Public Key 81 is means, which is used to decrypt files that have been encrypted with that certain private key (e.g. UserB Private Key 91) which forms the public/private key pair with the UserB Public Key 81. The UserB Public Key 81 is also means, which is created by the Peer-to-Peer Network Program 40 using the CryptoAPI 70. The UserB Public Key 81 is also means, which can be stored in persistent memory on the Storage 23 of the host computing device (e.g. Device "B" 11) by the Cryptographic Service Provider 71. The UserB Public Key 81 is also means, which can be transmitted to another computing device (e.g. Device "A" 10, Device "C" 12, and Device "D" 13) via various means (e.g. via Communications Means 30, floppy disk, E-mail Program 130, etc.). The UserB Public Key 81 is also means, which can be stored in persistent memory on the Storage 23 of other computing device (e.g. Device "A" 10, Device "C" 12, and Device "D" 13) by the Cryptographic Service Provider 71. The UserB Public Key 81 is also means, which can decrypt files on other computing device (e.g. Device "A" 10, Device "C" 12, and Device "D" 13), that have been encrypted with that certain private key (e.g. UserB Private Key 91).

The UserC Public Key 82 is means, which is used to decrypt files that have been encrypted with that certain private key (e.g. UserC Private Key 92) which forms the public/private key pair with the UserC Public Key 82. The UserC Public Key 82 is also means, which is created by the Peer-to-Peer Network Program 40 using the CryptoAPI 70. The UserC Public Key 82 is also means, which can be stored in persistent memory on the Storage 23 of the host computing device (e.g. Device "C" 12) by the Cryptographic Service Provider 71. The UserC Public Key 82 is also means, which can be transmitted to another computing device (e.g. Device "A" 10, Device "B" 11, and Device "D" 13) via various means (e.g. via Communications Means 30, floppy disk, E-mail Program 130, etc.). The UserC Public Key 82 is also means, which can be stored in persistent memory on the Storage 23 of other computing device (e.g. Device "A" 10, Device "B" 11, and Device "D" 13) by the Cryptographic Service Provider 71. The UserC Public Key 82 is also means, which can decrypt files on other computing device (e.g. Device "A" 10, Device "B" 11, and Device "D" 13), that have been encrypted with that certain private key (e.g. UserC Private Key 92).

The UserD Public Key 83 is means, which is used to decrypt files that have been encrypted with that certain private key (e.g. UserD Private Key 93) which forms the public/private key pair with the UserD Public Key 83. The UserD Public Key 83 is also means, which is created by the Peer-to-Peer Network Program 40 using the CryptoAPI 70. The UserD Public Key 83 is also means, which can be stored in persistent memory on the Storage 23 of the host computing device (e.g. Device "D" 13) by the Cryptographic Service Provider 71. The UserD Public Key 83 is also means, which can be transmitted to another computing device (e.g. Device "A" 10, Device "B" 11, and Device "C" 12) via various means (e.g. via Communications Means 30, floppy disk, E-mail Program 130, etc.). The UserD Public Key 83 is also means, which can be stored in persistent memory on the Storage 23 of other computing device (e.g. Device "A" 10, Device "B" 11, and Device "C" 12) by the Cryptographic Service Provider 71. The UserD Public Key 83 is also means, which can decrypt files on other computing device (e.g. Device "A" 10, Device "B" 11, and Device "C" 12), that have been encrypted with that certain private key (e.g. UserD Private Key 93).

The UserA Private Key 90 is means, which is used to encrypt files, which can be decrypted with that certain public key (e.g. UserA Public Key 80) which forms the public/private key pair with the UserA Private Key 90. The UserA Private Key 90 is also means, which is created by the Peer-to-Peer Network Program 40 using the CryptoAPI 70. The UserA Private Key 90 is also means, which can be stored in persistent memory on the Storage 23 of the host computing device (e.g. Device "A" 10) by the Cryptographic Service Provider 71.

The UserB Private Key 91 is means, which is used to encrypt files, which can be decrypted with that certain public key (e.g. UserB Public Key 81) which forms the public/private key pair with the UserB Private Key 91. The UserB Private Key 91 is also means, which is created by the Peer-to-Peer Network Program 40 using the CryptoAPI 70. The UserB Private Key 91 is also means, which can be stored in persistent memory on the Storage 23 of the host computing device (e.g. Device "B" 11) by the Cryptographic Service Provider 71.

The UserC Private Key 92 is means, which is used to encrypt files, which can be decrypted with that certain public key (e.g. UserC Public Key 82) which forms the public/private key pair with the UserC Private Key 92. The UserC Private Key 92 is also means, which is created by the Peer-to-Peer Network Program 40 using the CryptoAPI 70. The UserC Private Key 92 is also means, which can be stored in persistent memory on the Storage 23 of the host computing device (e.g. Device "C" 12) by the Cryptographic Service Provider 71.

The UserD Private Key 93 is means, which is used to encrypt files, which can be decrypted with that certain public key (e.g. UserD Public Key 83) which forms the public/private key pair with the UserD Private Key 93, The UserD Private Key 93 is also means, which is created by the Peer-to-Peer Network Program 40 using the CryptoAPI 70. The UserD Private Key 93 is also means, which can be stored in persistent memory on the Storage 23 of the host computing device (e.g. Device "D" 13) by the Cryptographic Service Provider 71.

The UserA FindMe File 100 is a computer file (e.g. a text file), which is created by the Peer-to-Peer Network Program 40. The UserA FindMe File 100 contains information relating to the Device "A" 10, and the user thereof. The UserA FindMe File 100 can contain information such as: the system name of the Device "A" 10; the name of the user of the Device "A" 10; the IP address of the Device "A" 10; etc. The UserA FindMe File 100 is created by the Peer-to-Peer Network Program 40 and can contain information from the User Information File 50. The UserA FindMe File 100 is created by the Peer-to-Peer Network Program 40 and can contain information obtained by the Peer-to-Peer Network Program 40 through use of the Application Programming Interface 72. The UserA FindMe File 100 can be created by the Peer-to-Peer Network Program 40 each time the Peer-to-Peer Network Program 40 is started, and any old versions of the UserA FindMe File 100 can be overwritten with a new version, to account for information changes to relating to the Device "A" 10, and/or the user thereof. The UserA FindMe File 100 can exist in plaintext form and/or ciphertext form. The UserA FindMe File 100 can be encrypted by the Peer-to-Peer Network Program 40 with the UserA Private Key 90 through use of the CryptoAPI 70 of the Device "A" 10. The UserA FindMe File 100 can be decrypted by the Peer-to-Peer Network Program 40 with the UserA Public Key 80 through use of the CryptoAPI 70 of the Device "A" 10. The UserA FindMe File 100 can be decrypted by the Peer-to-Peer Network Program 40 with the UserA Public Key 80 through use of the CryptoAPI 70 of other computing devices (e.g. Device "B" 11, Device "C" 12, and Device "D" 13). The UserA FindMe File 100 can be transmitted via Communications Means 30 from the Device "A" 10 to other computing devices (e.g. Device "B" 11, Device "C" 12, and Device "D" 13).

The UserB FindMe File 101 is a computer file (e.g. a text file), which is created by the Peer-to-Peer Network Program 40. The UserB FindMe File 101 contains information relating to the Device "B" 11, and the user thereof. The UserB FindMe File 101 can contain information such as: the system name of the Device "B" 11; the name of the user of the Device "B" 11; the IP address of the Device "B" 11; etc. The UserB FindMe File 101 is created by the Peer-to-Peer Network Program 40 and can contain information from the User Information File 50. The UserB FindMe File 101 is created by the Peer-to-Peer Network Program 40 and can contain information obtained by the Peer-to-Peer Network Program 40 through use of the Application Programming Interface 72. The UserB FindMe File 101 can be created by the Peer-to-Peer Network Program 40 each time the Peer-to-Peer Network Program 40 is started, and any old versions of the UserB FindMe File 101 can be overwritten with a new version, to account for information changes to relating to the Device "B" 11, and/or the user thereof. The UserB FindMe File 101 can exist in plaintext form and/or ciphertext form. The UserB FindMe File 101 can be encrypted by the Peer-to-Peer Network Program 40 with the UserB Private Key 91 through use of the CryptoAPI 70 of the Device "B" 11. The UserB FindMe File 101 can be decrypted by the Peer-to-Peer Network Program 40 with the UserB Public Key 81 through use of the CryptoAPI 70 of the Device "B" 11. The UserB FindMe File 101 can be decrypted by the Peer-to-Peer Network Program 40 with the UserB Public Key 81 through use of the CryptoAPI 70 of other computing devices (e.g. Device "A" 10, Device "C" 12, and Device "D" 13). The UserB FindMe File 101 can be transmitted via Communications Means 30 from the Device "B" 11 to other computing devices (e.g. Device "A" 10, Device "C" 12, and Device "D" 13).

The UserC FindMe File 102 is a computer file (e.g. a text file), which is created by the Peer-to-Peer Network Program 40. The UserC FindMe File 102 contains information relating to the Device "C" 12, and the user thereof. The UserC FindMe File 102 can contain information such as: the system name of the Device "C" 12; the name of the user of the Device "C" 12; the IP address of the Device "C" 12; etc. The UserC FindMe File 102 is created by the Peer-to-Peer Network Program 40 and can contain information from the User Information File 50. The UserC FindMe File 102 is created by the Peer-to-Peer Network Program 40 and can contain information obtained by the Peer-to-Peer Network Program 40 through use of the Application Programming Interface 72. The UserC FindMe File 102 can be created by the Peer-to-Peer Network Program 40 each time the Peer-to-Peer Network Program 40 is started, and any old versions of the UserC FindMe File 102 can be overwritten with a new version, to account for information changes to relating to the Device "C" 12, and/or the user thereof. The UserC FindMe File 102 can exist in plaintext form and/or ciphertext form. The UserC FindMe File 102 can be encrypted by the Peer-to-Peer Network Program 40 with the UserC Private Key 92 through use of the CryptoAPI 70 of the Device "C" 12. The UserC FindMe File 102 can be decrypted by the Peer-to-Peer Network Program 40 with the UserC Public Key 82 through use of the CryptoAPI 70 of the Device "C" 12. The UserC FindMe File 102 can be decrypted by the Peer-to-Peer Network Program 40 with the UserC Public Key 82 through use of the CryptoAPI 70 of other computing devices (e.g. Device "A" 10, Device "B" 11, and Device "D" 13). The UserC FindMe File 102 can be transmitted via Communications Means 30 from the Device "C" 12 to other computing devices (e.g. Device "A" 10, Device "B" 11, and Device "D" 13).

The UserD FindMe File 103 is a computer file (e.g. a text file), which is created by the Peer-to-Peer Network Program 40. The UserD FindMe File 103 contains information relating to the Device "D" 13, and the user thereof. The UserD FindMe File 103 can contain information such as: the system name of the Device "D" 13; the name of the user of the Device "D" 13; the IP address of the Device "D" 13; etc. The UserD FindMe File 103 is created by the Peer-to-Peer Network Program 40 and can contain information from the User Information File 50. The UserD FindMe File 103 is created by the Peer-to-Peer Network Program 40 and can contain information obtained by the Peer-to-Peer Network Program 40 through use of the Application Programming Interface 72. The UserD FindMe File 103 can be created by the Peer-to-Peer Network Program 40 each time the Peer-to-Peer Network Program 40 is started, and any old versions of the UserD FindMe File 103 can be overwritten with a new version, to account for information changes to relating to the Device "D" 13, and/or the user thereof. The UserD FindMe File 103 can exist in plaintext form and/or ciphertext form. The UserD FindMe File 103 can be encrypted by the Peer-to-Peer Network Program 40 with the UserD Private Key 93 through use of the CryptoAPI 70 of the Device "D" 13. The UserD FindMe File 103 can be decrypted by the Peer-to-Peer Network Program 40 with the UserD Public Key 83 through use of the CryptoAPI 70 of the Device "D" 13. The UserD FindMe File 103 can be decrypted by the Peer-to-Peer Network Program 40 with the UserD Public Key 83 through use of the CryptoAPI 70 of other computing devices (e.g. Device "A" 10, Device "B" 11, and Device "C" 12). The UserD FindMe File 103 can be transmitted via Communications Means 30 from the Device "D" 13 to other computing devices (e.g. Device "A" 10, Device "B" 11, and Device "C" 12).

The UserA Public Key BLOB 110 is means, which stores public keys (e.g. decryption keys) outside the Cryptographic Service Provider 71. The UserA Public Key BLOB 110 is also means, which is created by the Peer-to-Peer Network Program 40 using the CryptoAPI 70. The UserA Public Key BLOB 110 is also means, which can be used to store and transport the UserA Public Key 80. The UserA Public Key BLOB 110 is also means, which can be transmitted via Communications Means 30 from the Device "A" 10 to other computing devices (e.g. Device "B" 11, Device "C" 12, and Device "D" 13). The Peer-to-Peer Network Program 40, using the CryptoAPI 70, of other computing devices (e.g. Device "B" 11, Device "C" 12, and Device "D" 13) can extract the UserA Public Key 80 from the UserA Public Key BLOB 110, and save the UserA Public Key 80 to the Cryptographic Service Provider 71 of the other computing devices (e.g. Device "B" 11, Device "C" 12, and Device "D" 13) respectively.

The UserB Public Key BLOB 111 is means, which stores public keys (e.g. decryption keys) outside the Cryptographic Service Provider 71. The UserB Public Key BLOB 111 is also means, which is created by the Peer-to-Peer Network Program 40 using the CryptoAPI 70. The UserB Public Key BLOB 111 is also means, which can be used to store and transport the UserB Public Key 81. The UserB Public Key BLOB 111 is also means, which can be transmitted via Communications Means 30 from the Device "B" 11 to other computing devices (e.g. Device "A" 10, Device "C" 12, and Device "D" 13). The Peer-to-Peer Network Program 40, using the CryptoAPI 70, of other computing devices (e.g. Device "A" 10, Device "C" 12, and Device "D" 13) can extract the UserB Public Key 81 from the UserB Public Key BLOB 111, and save the UserB Public Key 81 to the Cryptographic Service Provider 71 of the other computing devices (e.g. Device "A" 10, Device "C" 12, and Device "D" 13) respectively.

The UserC Public Key BLOB 112 is means, which stores public keys (e.g. decryption keys) outside the Cryptographic Service Provider 71. The UserC Public Key BLOB 112 is also means, which is created by the Peer-to-Peer Network Program 40 using the CryptoAPI 70. The UserC Public Key BLOB 112 is also means, which can be used to store and transport the UserC Public Key 82. The UserC Public Key BLOB 112 is also means, which can be transmitted via Communications Means 30 from the Device "C" 12 to other computing devices (e.g. Device "A" 10, Device "B" 11, and Device "D" 13). The Peer-to-Peer Network Program 40, using the CryptoAPI 70, of other computing devices (e.g. Device "A" 10, Device "B" 11, and Device "D" 13) can extract the UserC Public Key 82 from the UserC Public Key BLOB 112, and save the UserC Public Key 82 to the Cryptographic Service Provider 71 of the other computing devices (e.g. Device "A" 10, Device "B" 11, and Device "D" 13) respectively.

The UserD Public Key BLOB 113 is means, which stores public keys (e.g. decryption keys) outside the Cryptographic Service Provider 71. The UserD Public Key BLOB 113 is also means, which is created by the Peer-to-Peer Network Program 40 using the CryptoAPI 70. The UserD Public Key BLOB 113 is also means, which can be used to store and transport the UserD Public Key 83. The UserD Public Key BLOB 113 is also means, which can be transmitted via Communications Means 30 from the Device "D" 13 to other computing devices (e.g. Device "A" 10, Device "B" 11, and Device "C" 12). The Peer-to-Peer Network Program 40, using the CryptoAPI 70, of other computing devices (e.g. Device "A" 10, Device "B" 11, and Device "C" 12) can extract the UserD Public Key 83 from the UserD Public Key BLOB 113, and save the UserD Public Key 83 to the Cryptographic Service Provider 71 of the other computing devices (e.g. Device "A" 10, Device "B" 11, and Device "C" 12) respectively.

The File Information Stream 120 is a stream of informational data, which is embedded into one of multiple streams, which compose the entire file structure of the computer file, which the File Information Stream 120 is associated, and is stored on Storage 23 (e.g. Microsoft NTFS storage device). The File Information Stream 120 can also be a stream of data, which is appended to, associated with, or related to the computer file. The File Information Stream 120 can include information such as: name of computer file; date created; author; system on which the computer file was created; description of the computer file; etc. The File Information Stream 120 is created by the Peer-to-Peer Network Program 40 through use of the Application Programming Interface 72. The File Information Stream 120 can be accessed by the Peer-to-Peer Network Program 40 through use of the Application Programming Interface 72, and the related information displayed to the user via the User Interface 20. The data can be a digital signal of any type of data (business, technical, pleasure), for instance, including but not limited to, a video digital signal, a audio digital signal.

The E-mail Program 130 is means, which enables the transfer or exchange of computer messages from one computing device to another computing device, utilizing certain Transport Control Protocol/Internet Protocol protocols (e.g. Simple Mail Transfer Protocol, Post Office Protocol 3, Internet Message Access Protocol, etc.). Computer messages transmitted via the E-mail Program 130 is can include text information, attached computer files, etc. The E-mail Program 130 is also means, which enables a user of a computing device (e.g. Device "A" 10, Device "B" 11, Device "C" 12, and Device "D" 13) to manually and electronically transfer a public key BLOB (e.g. the UserA Public Key BLOB 110, UserB Public Key BLOB 111, UserC Public Key BLOB 112, and UserD Public Key BLOB 113) from the originating computing device to another computing device. The E-mail Program 130 is also means, which enables a user of a computing device (e.g. Device "A" 10, Device "B" 11, Device "C" 12, and Device "D" 13) to manually and electronically transfer of the name of the user FindMe file (e.g. the UserA FindMe File 100, UserB FindMe File 101, UserC FindMe File 102, and UserD FindMe File 103) from the originating computing device to another computing device. The E-mail Program 130 is also means, which enables the Peer-to-Peer Network Program 40 of a computing device (e.g. Device "A" 10, Device "B" 11, Device "C" 12, and Device "D" 13) to automatically and electronically transfer a public key BLOB (e.g. the UserA Public Key BLOB 110, UserB Public Key BLOB 111, UserC Public Key BLOB 112, and UserD Public Key BLOB 113) from the originating computing device to another computing device. The E-mail Program 130 is also means, which enables the Peer-to-Peer Network Program 40 of a computing device (e.g. Device "A" 10, Device "B" 11, Device "C" 12, and Device "D" 13) to automatically and electronically transfer of the name of the user FindMe file (e.g. the UserA FindMe File 100, UserB FindMe File 101, UserC FindMe File 102, and UserD FindMe File 103) from the originating computing device to another computing device.

The Trusted Member List 140 is a listing within the Peer-to-Peer Network Program 40, which associates the user FindMe files (e.g. the UserA FindMe File 100, UserB FindMe File 101, UserC FindMe File 102, and UserD FindMe File 103) with the IP address of the computing device (e.g. Device "A" 10, Device "B" 11, Device "C" 12, and Device "D" 13) respectively. The Trusted Member List 140 can be updated each time the Peer-to-Peer Network Program 40 is started. The Trusted Member List 140 can be updated, or refreshed, on demand by the user of the Peer-to-Peer Network Program 40. The IP addresses listed in the Trusted Member List 140 are utilized by the Peer-to-Peer Network Program 40 to establish a trusted and decentralized peer-to-peer network.

The FTP Protocol 150 is a standard Internet protocol, known as the File Transfer Protocol. The FTP Protocol 150 is generally known as the simplest way to transmit and/or exchange computer files between computing devices on the Internet. The Peer-to-Peer Network Program 40 can utilize the FTP Protocol 150 to transmit and/or exchange computer files via Communications Means 30, between computing devices (e.g. Device "A" 10, Device "B" 11, Device "C" 12, and Device "D" 13). The Peer-to-Peer Network Program 40 can utilize the FTP Protocol 150 to communicate, via Communications Means 30, between computing devices (e.g. Device "A" 10, Device "B" 11, Device "C" 12, and Device "D" 13).

The HTTP Protocol 151 is a standard Internet protocol, known as the Hypertext Transfer Protocol. The HTTP Protocol 151 is a common way to transmit and/or exchange computer files between computing devices on the Internet. The Peer-to-Peer Network Program 40 can utilize the HTTP Protocol 151 to transmit and/or exchange computer files via Communications Means 30, between computing devices (e.g. Device "A" 10, Device "B" 11, Device "C" 12, and Device "D" 13). The Peer-to-Peer Network Program 40 can utilize the HTTP Protocol 151 to communicate, via Communications Means 30, between computing devices (e.g. Device "A" 10, Device "B" 11, Device "C" 12, and Device "D" 13).

The Chat Protocol 152 is a system for electronic communications between computing devices that involves a set of rules and conventions and is known as Internet Relay Chat (IRC) and is a standard Internet protocol. The Chat Protocol 152 is generally used for the real-time exchange of typed-in messages between a user of a computing device (e.g. Device "A" 10) and other users of other computing devices (e.g. Device "B" 11, Device "C" 12, and/or Device "D" 13), utilizing a communications means (e.g. the Communications Means 30). The Chat Protocol 152 can be used by the Peer-to-Peer Network Program 40 to establish a private chat session between a user of a computing device (e.g. Device "A" 10) and other users of other computing devices (e.g. Device "B" 11, Device "C" 12, and/or Device "D" 13), in conjunction with the trusted and decentralized peer-to-peer network the Peer-to-Peer Network Program 40 is able to establish.

The File Sharing Protocols 152 are set of rules and conventions used to leverage other Internet protocols (e.g. the FTP Protocol 150, HTTP Protocol 151, etc.) to search designated file folders on a storage device (e.g. the Storage 23) of a computing device (e.g. Device "A" 10, Device "B" 11, Device "C" 12, and Device "D" 13) for computer files which match a query inputted by a user of a computing device. The File Sharing Protocols 152 can be used by the Peer-to-Peer Network Program 40 to execute a search and retrieval of a computer file based on requests manually inputted by a user of a computing device (e.g. Device "A" 10), of designated file folders (e.g. Trusted Search Folder 62) on a storage device (e.g. the Storage 23) of other computing devices (e.g. Device "B" 11, Device "C" 12, and/or Device "D" 13), in conjunction with the trusted and decentralized peer-to-peer network the Peer-to-Peer Network Program 40 is able to establish.

By means of the User Interface 20, the user of a computing device with a connection to the Setup.exe File 41 (e.g. the Setup.exe File 41 being on CD-ROM, the Storage 23, etc.), double clicks on the Setup.exe File 41 to start the installation process. Next the Setup.exe File 41 commences to copy the Peer-to-Peer Network Program 40 onto the Storage 23. Next the Setup.exe File 41 requests information from the user and the user inputs that information via the User Interface 20. Next the Setup.exe File 41 saves that user information as a User Information File 50 on the Storage 23. Next the Setup.exe File 41 saves makes any necessary modifications to the system registry of the Operating System 25. Next the Setup.exe File 41 creates the FindMe Folder 60, the Searched FindMe Results Folder 61, and the Trusted Search Folder 62 on the Storage 23. These steps are performed for each computing device (e.g. Device "A" 10, Device "B" 11, Device "C" 12, Device "D" 13) intended to run the Peer-to-Peer Network Program 40.

Next, and upon first use of the Peer-to-Peer Network Program 40, the Peer-to-Peer Network Program 40 prompts the user of the host computing device to input a name which identifies that user (e.g. UserA). Next, the Peer-to-Peer Network Program 40 calls cryptographic functionality of the CryptoAPI 70 (e.g. the Peer-to-Peer Network Program 40 calls the "CryptAcquireContext" function of the Windows CryptoAPI) of the Operating System 25 to create a public/private key pair. Next, the CryptoAPI 70 returns a handle to the Cryptographic Service Provider 71 (e.g. the Windows CryptoAPI returns a handle to the Microsoft RSA/Schannel Cryptographic Service Provider to the Peer-to-Peer Network Program 40). Next, the Peer-to-Peer Network Program 40 calls cryptographic functionality of the CryptoAPI 70 of the Operating System 25 to instruct the Cryptographic Service Provider 71 to execute the creation of the public/private key pair (e.g. the Peer-to-Peer Network Program 40 calls the "CryptGenKey" function of the Windows CryptoAPI). Next, the CryptoAPI 70 instructs the Cryptographic Service Provider 71 (e.g. the Windows CryptoAPI instructs the Microsoft RSA/Schannel Cryptographic Service Provider to create the public/private key pair (e.g. UserAPublic Key 80 and UserA Private Key 90)).

Next, the Peer-to-Peer Network Program 40 creates a plaintext version of the UserA FindMe File 100 (e.g. a text file), and at this point UserA FindMe File 100 is a blank file. Next, the Peer-to-Peer Network Program 40 calls functionality of the Application Programming Interface 72 of the Operating System 25 and obtains identifiable network information on the host computing device (e.g. Device "A" 10) (e.g. the Peer-to-Peer Network Program 40 calls the "CurrentIpAddress" function of the Windows API). Next, the Application Programming Interface 72 queries the Operating System 25 and obtains identifiable network information on the host computing device (e.g. Device "A" 10), then the Application Programming Interface 72 transmits the identifiable network information to the Peer-to-Peer Network Program 40. Next, the Peer-to-Peer Network Program 40 writes the identifiable network information into the plaintext version of the UserA FindMe File 100. Next, the Peer-to-Peer Network Program 40 calls cryptographic functionality of the CryptoAPI 70 (e.g. the Peer-to-Peer Network Program 40 calls the "CPEncrypt" function of the Windows CryptoAPI) of the Operating System 25 to encrypt the UserA FindMe File 100 with a private key (e.g. the UserA Private Key 90). At this point the Peer-to-Peer Network Program 40 is configured to execute other embodiments of the invention.

Next, and each time, the user initiates the Peer-to-Peer Network Program 40 by means of the User Interface 20, the Peer-to-Peer Network Program 40 automatically searches each of the Trusted Search Folders 62 for computer files lacking a File Info Stream 120 through use of functionality of the Application Programming Interface 72 of the Operating System 25 (e.g. the Peer-to-Peer Network Program 40 calls the "FileSystemObject" object model of the Windows API to open, write, create, and test computer files). Next, and for each computer file in each of the Trusted Search Folders 62 that lacks a File Info Stream 120, the Peer-to-Peer Network Program 40 calls functionality of the Application Programming Interface 72 of the Operating System 25, then opens the User Information File 50, then writes information from the User Information File 50 into the File Info Stream 120 (e.g. the Peer-to-Peer Network Program 40 calls the "FileSystemObject" object model of the Windows API to open, write, create, and test computer files). The Peer-to-Peer Network Program 40 also enables the user of the host computing device to manually input other information into the File Info Stream 120 for each related computer file and accomplishes this task by calling functionality of the Application Programming Interface 72 of the Operating System 25, then writes the information the user manually inputted into the File Info Stream 120 (e.g. the Peer-to-Peer Network Program 40 calls the "FileSystemObject" object model of the Windows API to open, write, create, and test computer files).

Next, the user (e.g. UserA) of a computing device (e.g. Device "A" 10) inputs a command to the Peer-to-Peer Network Program 40 via the User Interface 20, to export their related public key (e.g. UserA Public Key 80) to a recipient or recipients, being a user of a another computing device or to other users of other computing devices and the UserA inputs the E-mail addresses of the recipient or recipients. Next, the Peer-to-Peer Network Program 40 calls functionality of the CryptoAPI 70 of the Operating System 25 to create a computer file capable of transporting the UserA Public Key 80 (e.g. the Peer-to-Peer Network Program 40 calls the "CryptExportKey" function of the Windows CryptoAPI to generate a public key BLOB of UserA Public Key 110). Next, the Peer-to-Peer Network Program 40 instructs the E-mail Program 130 of the Device "A" 10 to transmit to the recipient or recipients the name of the UserA FindMe File 110 and a copy of the UserA Public Key BLOB 110. Next, the E-mail Program 130 of a recipient's computing device (e.g. Device "B" 11) receives from transmission from the UserA the name of the UserA FindMe File 110 and a copy of the UserA Public Key BLOB 110.

Next, the user of the Device "B" 11 (upon receipt of E-mail transmission from the UserA the name of the UserA FindMe File 110 and the copy of the UserA Public Key BLOB 110) instructs the Peer-to-Peer Network Program 40 via the User Interface 20, to import the UserA Public Key 80. Next, the Peer-to-Peer Network Program 40 instructs the CryptoAPI 70 of the Operating System 25 of the Device "B" 11 to import the UserA Public Key 80 from the UserA Public Key BLOB 110 to the Cryptographic Service Provider 71 (e.g. the Peer-to-Peer Network Program 40 calls the "CryptImportKey" function of the Windows CryptoAPI, then the Windows CryptoAPI extracts the UserA Public Key 80 from the UserA Public Key BLOB 110, then the Windows CryptoAPI imports and the UserA Public Key 80 to the Microsoft RSA/Schannel Cryptographic Service Provider). Next the Peer-to-Peer Network Program 40 writes an entry in the Trusted Member List 140 establishing (or mapping) a relationship between the name of the UserA FindMe File 100 (as received from E-mail transmission) and the UserA Public Key 80.

Next, the user of the Device "A" 10 (e.g. UserA) instructs the Peer-to-Peer Network Program 40 via the User Interface 20 of Device "A" 10, to search (via the Communications Means 30) for members (who are then connected to the Communications Means 30) listed in the Trusted Member List 140 (being the members of the trusted peer-to-peer network the Peer-to-Peer Network Program 40 is capable of establishing) via connected to the Communications Means 30. Next, the Peer-to-Peer Network Program 40 accesses the list of computer file names in the Trusted Member List 140 and executes a search request of an un-trusted peer-to-peer network for computer files matching the name of the computer files listed in the Trusted Member List 140 utilizing the File Sharing Protocols 153. Next, the Peer-to-Peer Network Program 40 of another computing device (e.g. Device "B" 11) receives the search request for various computer files (e.g. user "FindMe" files) and transmits the computer files matching the search request (e.g. UserB FindMe File 101) to the Device "A" 10 utilizing transmission protocols (e.g. FTP Protocol 150, HTTP Protocol 151).

Next, the Peer-to-Peer Network Program 40 of the Device "A" 10 receives from transmission the UserB FindMe File 101, then saves the UserB FindMe File 101 in the FindMe Results Folder 61 in Storage 23 of the Device "A" 10. Next, the Peer-to-Peer Network Program 40 instructs the CryptoAPI 70 of the Operating System 25 of the Device "A" 10 to decrypt the UserA FindMe File 101 using the public key as associated with the UserA FindMe File 101 in the Trusted Member List 140 through use of the Cryptographic Service Provider 71 (e.g. the Peer-to-Peer Network Program 40 calls the "CPDecrypt" function of the Windows CryptoAPI, then the Windows CryptoAPI calls the UserB Public Key 61 from the Microsoft RSA/Schannel Cryptographic Service Provider, then the Windows CryptoAPI decrypts the UserB FindMe File 101 creating a plaintext version of the UserB FindMe File 101). Next, the Peer-to-Peer Network Program 40 of the Device "A" 10 opens the plaintext version of the UserB FindMe File 101) and reads the identifiable network information (e.g. the IP address of Device "B" 11) then writes an entry in the Trusted Member List 140 containing: the identifiable network information of Device "B" 11, the name of the UserB FindMe File 101, and name of the UserB. At this point, the user of the Device "A" 10 is able to use the Peer-to-Peer Network Program 40 to establish a trusted and decentralized peer-to-peer network, utilizing the IP addresses listed on a member-by-member basis in the Trusted Member List 140.

Users of the Peer-to-Peer Network Program 40 can utilize the trusted and decentralized peer-to-peer network to establish trusted chat sessions. This is accomplished when the user of a computing device (e.g. Device "A" 10) instructs the Peer-to-Peer Network Program 40 via the User Interface 20, to establish a chat session with user defined members listed in the Trusted Member List 140. Next, the Peer-to-Peer Network Program 40 reads the identifiable network information (e.g. the IP address of the members) in the Trusted Member List 140 of the members, then, using the Chat Protocol 152, the Peer-to-Peer Network Program 40 transmits a chat session request to the computing devices (e.g. Device "B" 11, Device "C" 12, Device "D" 13, etc.) of the members (e.g. UserB, UserC, UserD, etc.). Each computing device that is then: connected to the Communications Means 30 utilizing identifiable network information (e.g. IP address) matching the identifiable network information listed on a member-by-member basis in the Trusted Member List 140 of the Device "A" 10; running the Peer-to-Peer Network Program 40; and receives the transmitted chat session request from Device "A" 10 utilizing the Chat Protocol 152; then notifies the user (e.g. UserB, UserC, UserD, etc.) of that particular computing device (e.g. Device "B" 11, Device "C" 12, Device "D" 13, etc.) via the User Interface 20 of their respective computing device, that a chat session has been initiated by a member of the trusted network. Next, the user (e.g. UserB, UserC, UserD, etc.) of that particular computing device (e.g. Device "B" 11, Device "C" 12, Device "D" 13, etc.) instructs the Peer-to-Peer Network Program 40 to either accept or deny the chat session, via the User Interface 20 of their respective computing device. If the user (e.g. UserB, UserC, UserD, etc.) of that particular computing device (e.g. Device "B" 11, Device "C" 12, Device "D" 13, etc.) instructs the Peer-to-Peer Network Program 40 to deny the chat session, via the User Interface 20 of their respective computing device, then the Peer-to-Peer Network Program 40 denies the chat session utilizing the Chat Protocol 152 and transmits a denial notification to the Peer-to-Peer Network Program 40 of the Device "A" 10, then the Peer-to-Peer Network Program 40 of the Device "A" 10 notifies the user (e.g. UserA) of the Device "A" 10 that the chat session has been denied, then the Peer-to-Peer Network Program 40 of the Device "B" 11 ends the chat session utilizing the Chat Protocol 152. If the user (e.g. UserB, UserC, UserD, etc.) of that particular computing device (e.g. Device "B" 11, Device "C" 12, Device "D" 13, etc.) instructs the Peer-to-Peer Network Program 40 to accept the chat session, via the User Interface 20 of their respective computing device, then the Peer-to-Peer Network Program 40 accepts the chat session utilizing the Chat Protocol 152, then the Peer-to-Peer Network Program 40 maintains the chat session utilizing the Chat Protocol 152.

Users of the Peer-to-Peer Network Program 40 can utilize the trusted and decentralized peer-to-peer network to conduct trusted file sharing or searching. This is accomplished when the user of a computing device (e.g. Device "A" 10) instructs the Peer-to-Peer Network Program 40 via the User Interface 20, to establish a file search of the computing devices controlled or operated by the members listed in the Trusted Member List 140 by inputting the name of the computer file desired via the User Interface 20. Next, the Peer-to-Peer Network Program 40 reads the identifiable network information (e.g. the IP address of the members) in the Trusted Member List 140 of the members, then, using the File Sharing Protocols 153, the Peer-to-Peer Network Program 40 transmits a search request, for the computer file requested by UserA, to the computing devices listed in the Trusted Member List 140 (e.g. Device "B" 11, Device "C" 12, Device "D" 13, etc.) of the members (e.g. UserB, UserC, UserD, etc.). Each computing device that is then: connected to the Communications Means 30 utilizing identifiable network information (e.g. IP address) matching the identifiable network information listed on a member-by-member basis in the Trusted Member List 140 of the Device "A" 10; running the Peer-to-Peer Network Program 40; and receives the transmitted file search request from Device "A" 10 utilizing the File Sharing Protocols 153; then the Peer-to-Peer Network Program 40 of that particular computing device (e.g. Device "B" 11, Device "C" 12, Device "D" 13, etc.) searches for the requested file in the Trusted Search Folder 62.

If the requested computer file is not located by the Peer-to-Peer Network Program 40 of a particular computing device (e.g. Device "B" 11, Device "C" 12, Device "D" 13, etc.) in the respective Trusted Search Folder 62, then the Peer-to-Peer Network Program 40 does not reply. If the requested computer file is located by the Peer-to-Peer Network Program 40 of a particular computing device (e.g. Device "B" 11, Device "C" 12, Device "D" 13, etc.) in the respective Trusted Search Folder 62, then the Peer-to-Peer Network Program 40 transmits the name of the matching computer file along with any information found in the File Info Stream 120 related to the matching computer file, to the Peer-to-Peer Network Program 40 of the Device "A" 10. Next, the Peer-to-Peer Network Program 40 of the Device "A" 10 displays via the User Interface 20, the computer file names, and any information found in the File Info Stream 120 related to the matching computer file, received from any and/or all computing devices (e.g. Device "B" 11, Device "C" 12, Device "D" 13, etc.) that have responded to the search request. Next, the user of the Device "A" 10 selects, via the User Interface 20, which computer file or computer files the Peer-to-Peer Network Program 40 is to download via the trusted peer-to-peer network. Next, the Peer-to-Peer Network Program 40 of the Device "A" 10 transmits a download request using communication protocols (e.g. FTP Protocol 150, HTTP Protocol 151) to the computing device and/or computing devices, by means of the identifiable network information (e.g. the IP address of the computing device and/or computing devices) in the Trusted Member List 140 and as associated with the specific computer file or computer files selected by the UserA. Next, the Peer-to-Peer Network Program 40 of the computing device and/or computing devices respectively (e.g. Device "B" 11, Device "C" 12, Device "D" 13, etc.), containing the computer file or computer files selected by the UserA, initiates a download of the computer file or computer files using communication protocols (e.g. FTP Protocol 150, HTTP Protocol 151). Next, the Peer-to-Peer Network Program 40 of the Device "A" 10 receives and saves the download computer file or computer files to the Trusted Search Folder 62.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A user computing device comprising:
a processor;
storage having a trusted member list of computing devices of a decentralized peer-to-peer network;
a transceiver that communicates with the computing devices of the trusted member list via a communication mechanism;
a peer-to-peer network program which communicates through the transceiver with the computing devices running a copy of the peer-to-peer network program, the peer-to-peer network program sends computer files, queries and instructions to and receives computer files, queries and instructions from the other computer devices; and
a crypto API that encrypts and decrypts files, the processor sending a first search request created by the peer-to-peer network program for a first desired computer file from the transceiver to the computing devices via the communication mechanism, and the transceiver receiving the first desired computer file from a first user computing device of the computing devices via the communication mechanism; the processor sending a second search request created by the peer-to-peer network program for a second desired computer file from the transceiver to the computing devices via that communication mechanism, and the transceiver receiving the second desired computer file from a second user computing device of the computing devices via the communication mechanism, the storage includes a trusted search folder which is searched by the computing devices running the copy of the peer-to-peer network program.

2. The computing device of claim 1 wherein the storage includes the trusted search folder where computer files resulting from search queries performed by the Peer-to-peer network program are saved.

3. The computing device of claim 2 wherein the peer-to-peer network program utilizes the crypto API to execute encryption and decryption of the computer files.

4. The computing device of claim 3 wherein the crypto API authenticates computer files utilizing digital certificates; and maintains and manages digital certificates, and public and private encryption keys.

5. The computing device of claim 4 including an application programming interface which enables the peer-to-peer network program to retrieve IP address information about the computing devices.

6. The computing device of claim 5 further comprising a findme file created by the Peer-to-peer network program which contains IP addresses of the computing devices, and network names of the computing devices, and wherein the peer-to-peer network program, through the transceiver, uses a findme file in the computing devices to establish the trusted member list.

7. The computing device of claim 6 wherein the peer-to-peer network program appends a file information stream that has attributes of a file structure of a computer file to the computer file that is sent through the transceiver to the computing devices.

8. The computing device of claim 7 wherein the processor executes a search request of an un-trusted peer-to-peer network to locate the computer devices for the trusted member list.

9. The computing device of claim 8 wherein the peer-to-peer network program sends instructions to and receives instructions from the other computer devices.

10. A method for a user computing device comprising the steps of:
storing with a processor in a storage a trusted member list of computing devices of a decentralized peer-to-peer network;
sending by the processor a first search request created by a peer-to-peer network program, which communicates through a transceiver with the computing devices running a copy of the peer-to-peer network program, for a first encrypted desired computer file from the transceiver to the computing devices via a communication mechanism;
receiving by the transceiver the first desired computer file from a first user computing device of the computing devices via the communication mechanism;
decrypting with a crypto API, that encrypts and decrypts files, the first encrypted desired computer file;
sending by the processor a second search request created by the peer-to-peer network program for a second encrypted desired computer file from the transceiver to the computing devices via the communication mechanism;
receiving by the transceiver the first desired computer file from a second user computing device of the computing devices via the communication mechanism;
decrypting with the crypto API the second encrypted desired computer file;
sending with the peer-to-peer network program computer files, instructions and queries to and receiving computer files, instructions and queries from the other computer devices; and
saving in a trusted search folder of storage computer files and searching by the computing devices running the copy of the peer-to-peer network program the trusted search folder.

11. The method of claim 10 including the steps of saving in the trusted search folder of storage computer files resulting from search queries performed by the peer-to-peer network program.

12. The method of claim 11 wherein peer-to-peer network program utilizes the crypto API to execute encryption and decryption of the computer files.

13. The method of claim 12 including the steps of authenticating with the crypto API computer files utilizing digital certificates; and maintaining and managing digital certificates, and public and private encryption keys with the crypto API.

14. The method of claim 13 including the step of enabling with an application programming interface the peer-to-peer network program to retrieve IP address information about the computing devices.

15. The method of claim 14 including the steps of creating a findme file by the peer-to-peer network program which contains IP addresses of the computing devices, and network names of the computing devices, and the Peer-to-peer network program, through the transceiver, using a findme file in the computing devices to establish the trusted member list.

16. The method of claim 15 including the step of the peer-to-peer network program appending a file information stream that has attributes of a file structure of a computer file to the computer file that is sent through the transceiver to the computing devices.

17. The method of claim 16 including the step of the processor executing a search request of an un-trusted peer-to-peer network to locate the computer devices for the trusted member list.

18. The method of claim 17 including the steps of the peer-to-peer network program sending instructions to and receiving instructions from the other computer devices.

19. A user computing device comprising:
- a processor;
- storage having a trusted member list of computing devices of a decentralized peer-to-peer network;
- a transceiver that communicates with the computing devices of the trusted member list via a communication mechanism;
- a peer-to-peer network program which communicates through the transceiver with the computing devices running a copy of the peer-to-peer network program, the peer-to-peer network program sends computer files, queries and instructions to and receives computer files, queries and instructions from the other computer devices; and
- a crypto API that encrypts and decrypts files, the processor sending a first search request created by the peer-to-peer network program for a first desired computer file from the transceiver to the computing devices via the communication mechanism, and the transceiver receiving the first desired computer file from a first user computing device of the computing devices via the communication mechanism; the processor sending a second search request created by the peer-to-peer network program for a second desired computer file from the transceiver to the computing devices via that communication mechanism, and the transceiver receiving the second desired computer file from a second user computing device of the computing devices via the communication mechanism, the storage includes a trusted search folder where computer files resulting from search queries performed by the Peer-to-peer network program are saved, and which is searched by the computing devices running the copy of the peer-to-peer network program.

20. A method for a user computing device comprising the steps of:
- storing with a processor in a storage a trusted member list of computing devices of a decentralized peer-to-peer network;
- sending by the processor a first search request created by a peer-to-peer network program, which communicates through a transceiver with the computing devices running a copy of the peer-to-peer network program, for a first encrypted desired computer file from the transceiver to the computing devices via a communication mechanism;
- receiving by the transceiver the first desired computer file from a first user computing device of the computing devices via the communication mechanism;
- decrypting with a crypto API, that encrypts and decrypts files, the first encrypted desired computer file;
- sending by the processor a second search request created by the peer-to-peer network program for a second encrypted desired computer file from the transceiver to the computing devices via the communication mechanism;
- receiving by the transceiver the first desired computer file from a second user computing device of the computing devices via the communication mechanism;
- decrypting with the crypto API the second encrypted desired computer file;
- sending with the peer-to-peer network program computer files, instructions and queries to and receiving computer files, instructions and queries from the other computer devices; and
- saving in a trusted search folder of storage computer files and searching by the computing devices running the copy of the peer-to-peer network program the trusted search folder.

* * * * *